(12) United States Patent
Suzaki et al.

(10) Patent No.: US 8,789,945 B2
(45) Date of Patent: Jul. 29, 2014

(54) CONTACT LENS FOR CORRECTION OF IRREGULAR ASTIGMATISM

(75) Inventors: Asaki Suzaki, Kasugai (JP); Yuji Goto, Komaki (JP); Naoyuki Maeda, Suita (JP)

(73) Assignees: Menicon Co., Ltd., Nagoya (JP); Osaka University, Osaka (JP)

( * ) Notice: Subject to any disclaimer, the term of this patent is extended or adjusted under 35 U.S.C. 154(b) by 38 days.

(21) Appl. No.: 13/640,853

(22) PCT Filed: Mar. 24, 2011

(86) PCT No.: PCT/JP2011/001748
§ 371 (c)(1),
(2), (4) Date: Oct. 25, 2012

(87) PCT Pub. No.: WO2011/129060
PCT Pub. Date: Oct. 20, 2011

(65) Prior Publication Data
US 2013/0050638 A1 Feb. 28, 2013

(30) Foreign Application Priority Data
Apr. 14, 2010 (JP) .................................. 2010-093192

(51) Int. Cl.
*G02C 7/04* (2006.01)
(52) U.S. Cl.
CPC ........................................ *G02C 7/04* (2013.01)
USPC ............. 351/159.22; 351/159.07; 351/159.19
(58) Field of Classification Search
CPC ...................................... G02C 7/04; G02C 7/041
USPC .............. 351/159.06, 159.07, 159.19, 159.22
See application file for complete search history.

(56) References Cited

U.S. PATENT DOCUMENTS 5,020,898 A * 6/1991 Townsley ................. 351/159.07
5,601,759 A 2/1997 Apollonio
(Continued)

FOREIGN PATENT DOCUMENTS

JP  A-63-95415  4/1988
JP  A-10-10476  1/1998
(Continued)

OTHER PUBLICATIONS

May 10, 2011 International Search Report issued in International Patent Application No. PCT/JP2011/001748.

(Continued)

*Primary Examiner* — Darryl J Collins
(74) *Attorney, Agent, or Firm* — Oliff PLC

(57) ABSTRACT

Disclosed is an implementation of new technology for effectively providing a contact lens capable of achieving satisfactory corrective effects even with respect to irregular astigmatism (residual irregular astigmatism) caused by a conical cornea and so forth, which could not be corrected with conventional eye glasses or contact lens, wherein the contact lens is not dependent on being made to order for each wearer but is industrially mass-producible by means of a practical and novel structure. A contact lens for correction of irregular astigmatism is disclosed wherein a positive correction area (27) is provided on one side of a special radial line (30) and a negative correction area (28) is provided on another side while in any of the correction areas (27, 28) a lens power is configured so that an absolute value becomes progressively larger from an outer peripheral edge part towards a central portion.

17 Claims, 15 Drawing Sheets

(56) References Cited

U.S. PATENT DOCUMENTS

| | | |
|---|---|---|
| 2005/0105047 A1 | 5/2005 | Smitth, III et al. |
| 2007/0030444 A1 | 2/2007 | Chauveau et al. |
| 2007/0115431 A1 | 5/2007 | Smith, III et al. |
| 2009/0161065 A1 | 6/2009 | Smith, III et al. |
| 2010/0060849 A1 | 3/2010 | Hibino |
| 2011/0051081 A1* | 3/2011 | Del Nobile .................. 351/169 |
| 2011/0090455 A1* | 4/2011 | Gupta et al. .................. 351/169 |

FOREIGN PATENT DOCUMENTS

| | | |
|---|---|---|
| JP | A-2005-189875 | 7/2005 |
| JP | B-3870219 | 1/2007 |
| JP | A-2007-503235 | 2/2007 |
| JP | A-2009-525835 | 7/2009 |
| WO | WO 2008/062503 A1 | 5/2008 |

OTHER PUBLICATIONS

Nov. 6, 2012 International Preliminary Report on Patentability issued in International Application No. PCT/JP2011/001748.

Mar. 25, 2014 Office Action issued in Japanese Patent Application No. 2010-093192 (with translation).

* cited by examiner

HORIZONTAL AXIS: DISTANCE FROM LENS CENTER(mm) WHERE
  PLUS MEANS TOP SIDE AND MINUS MEANS BOTTOM SIDE
VERTICAL AXIS: LENS POWER(D)

FIG. 13 COMPARATIVE DISPLAY OF EACH ZERNIKE VECTOR MAP WHEN WEARING CONTACT LENS FOR CORRECTION OF IRREGULAR ASTIGMATISM AND WITH NAKED EYE

HORIZONTAL AXIS: DISTANCE FROM LENS CENTER (mm) WHERE
PLUS MEANS TOP SIDE AND MINUS MEANS BOTTOM SIDE
VERTICAL AXIS: LENS POWER (D)

HORIZONTAL AXIS: DISTANCE FROM LENS CENTER (mm) WHERE
PLUS MEANS TOP SIDE AND MINUS MEANS BOTTOM SIDE
VERTICAL AXIS: LENS POWER (D)

HORIZONTAL AXIS: DISTANCE FROM LENS CENTER(mm) WHERE
　　　　　　　　PLUS MEANS TOP SIDE AND MINUS MEANS BOTTOM SIDE
VERTICAL AXIS: LENS POWER(D)

HORIZONTAL AXIS: DISTANCE FROM LENS CENTER (mm) WHERE
PLUS MEANS TOP SIDE AND MINUS MEANS BOTTOM SIDE
VERTICAL AXIS: LENS POWER (D)

CONTACT LENS FOR CORRECTION OF IRREGULAR ASTIGMATISM

TECHNICAL FIELD

The present invention relates to a contact lens provided for the correction of irregular astigmatism caused by a conical cornea or the like.

BACKGROUND ART

From the past, eyeglasses and contact lenses have been prescribed for refractive errors of the eyes. These eyeglasses and contact lenses provide good vision with correction of the optical characteristics of the eyes by prescribing according to the optical characteristics of the wearer's eyes. Particularly with contact lenses, various types of research are progressing to realize better vision, and for example, many structures have been proposed from the past with goals, for example, such as improving positional stability in the circumferential direction when correcting astigmatism or presbyopia, realizing bifocal optical characteristics when correcting presbyopia, improving comfort when wearing and the like. One of the inventors of this invention also disclosed in Japanese Patent No. 3870219 (Patent Document 1), a series of combined contact lenses equipped with a novel structure in common for which there was no significant loss of vision quality even when the position on the cornea was displaced.

As can be understood from the fact that their optical characteristics are specified by the spherical lens power, the cylindrical lens power, and cylindrical lens axial direction, eye glasses and contact lenses of the conventional structure exhibit an effective corrective effect on myopia, hyperopia, presbyopia, and astigmatism. On the other hand, with this kind of eye glasses and contact lenses, even when the spherical lens power, the cylindrical lens power, and the cylindrical lens axial direction are sufficiently matched to the eyes, there may still be complaints of, "It's hard to see," "I can't see objects well," and the like. This kind of vision problem, which could not be put into numerical value form in the past and was due to irregular astigmatism of the eyes, was called residual irregular astigmatism.

Contact lenses having a corrective effect on this kind of residual irregular astigmatism have been researched, but it is still not possible to achieve a satisfactory effect that can be provided at the practical level. For example, residual irregular astigmatism is often due to an abnormality in the corneal surface shape, such as a conical cornea or the like, so the mainstream approach is to substantially correct the corneal shape by wearing a hard contact lens that covers the abnormal part of the corneal surface shape and pressing to correct the corneal surface shape, or forming a lacrimal lens between it and the cornea, but there are problems such as the abnormal part of the corneal surface shape being strongly pressed by the inner surface side of the hard contact lens, having wearing irritation due to the hard contact lenses, requiring expertise for the prescription, having residual irregular astigmatism newly appear deriving from the shape of the posterior surface of the cornea due to overcorrection of the irregular astigmatism due to the corneal surface shape by the hard contact lens, and the like, so a satisfactory point has not yet been reached. In light of this, in recent years, methods have been tried for reducing pressure, wearing irritation, and prescription problems by wearing wide diameter hard contact lenses which cover to the sclerocornea, but resolution of the root problem has still not been achieved. Also, there have been studies on doing shape processing of the lens surface using LASIK technology or the like, and making custom order contact lenses for handling the non-uniform corneal surface shape of each patient, but it is difficult to realize this technically without using high cost laser technology, a special precision machining lathe or the like, so practical use has not been achieved due to problems of machining technology and problems in terms of manufacturing costs.

Meanwhile, along with dramatic advances in optical and electronic analytic technology in recent years, it has become possible to do quantitative measurement using a wave-front sensor even for residual irregular astigmatism which could not be put in numerical value form in the past. By using this wave-front sensor in the optical system, for aberrations expressed by Zernike polynomials, it is possible to measure and put into numerical value form not only low order aberrations which could be corrected with conventional structure eye glasses and contact lenses, such as myopia, astigmatism and the like, but also high order aberrations that were regarded as residual irregular astigmatism in the past.

However, even if it is possible to put the residual irregular astigmatism into numerical value form with the optical system of the eye using a wave-front sensor, for example, the mode of the residual irregular astigmatism differs for each individual, so it is necessary to produce individual contact lenses having the optical characteristics for correcting that. Also, even if optical characteristics that correct irregular astigmatism at a high level of precision for each individual can be given together with a positioning mechanism for specifying the circumferential rest position in the worn state, the vision quality is unstable because it is not possible to completely control displacement of the contact lens on the cornea. Because of that, ultimately, the same as in the past, not only is it not possible to avoid problems with machining technology and problems in terms of manufacturing costs, but it is also hard to say that satisfactory vision quality is realized, and there was the problem that it is still not possible to realize a contact lens that exhibits an effective corrective effect for residual irregular astigmatism.

BACKGROUND ART DOCUMENTS

Patent Documents

Patent Document 1: Japanese Patent No. 3870219

SUMMARY OF THE INVENTION

Problem the Invention Attempts to Solve

The present invention was created with the circumstances described above as the background, and its object is to realize novel technology which can efficiently provide contact lenses capable of exhibiting a good corrective effect even on irregular astigmatism due to a conical cornea or the like for which correction is not possible with conventional eye glasses or contact lenses (residual irregular astigmatism) by considering the measurement information of the residual irregular astigmatism of the optical system of the eye using a wave-front sensor developed in recent years, without relying on custom orders for each wearer, using a practical, novel structure which can be industrially mass produced.

Means for Solving the Problem

To address these problems, the inventors of this invention first studied the measurement results using a wave-front sensor on a test subject eye with residual irregular astigmatism, and researched the characteristics. As a result, they confirmed that there are common tendencies in patients with conical corneas, which are the cause of many cases of residual irregular astigmatism. Furthermore, they had conical cornea patients wear contact lenses given various types of optical characteristics, measured the optical characteristics using a wave-front sensor in a state with the lenses worn, and did more research. Then, they found out that by providing to the market contact lenses given types of optical characteristics a level for which mass production is possible, it is possible to exhibit good corrective effects for patients with residual irregular astigmatism due to a conical cornea, and they were able to complete the present invention based on that knowledge.

A first mode of the present invention is a contact lens for correction of irregular astigmatism, which is adapted to correct asymmetrical power difference due to irregular astigmatism, comprising: a positioning mechanism provided for specifying a circumferential rest position of the contact lens in a worn state; a positive correction area using a positive lens power on one side on a special radial line at the rest position specified by the positioning mechanism; and a negative correction area using a negative lens power at another side on the special radial line, wherein a maximum lens power of the positive correction area is set at a central portion of the positive correction area, and a minimum lens power of the negative correction area is set at a central portion of the negative correction area.

The contact lens with the structure according to this mode is the first contact lens capable of correcting irregular astigmatism with a high level of practical utility and that can be industrially mass produced. This is based on the present inventor's newly discovering that it is possible to exhibit sufficient corrective effects using simple optical characteristics for which the positive correction area and the negative correction area are provided on a special radial line, even for residual irregular astigmatism which was thought in the past to only be correctable with custom orders because of the big differences between individuals.

In particular, the grounds for providing a contact lens effective for correcting residual irregular astigmatism using this kind of simple optical characteristic are first, because we found that with analysis and study of the measurement results of patient eyes using the wave-front sensor, it is possible to roughly understand residual irregular astigmatism in the optical system of the eye as an aberration with common tendencies for many people, and second, because we found that according to analysis and study of the measurement results of patient eyes wearing contact lenses using a wave-front sensor, it is possible to exhibit sufficient corrective effect on residual irregular astigmatism even when not a contact lens with optical characteristics perfectly correlated to the residual irregular astigmatism for each individual.

In regards to the former point, under the condition of having believed that the only choice is to handle things individually because there is uneven power distribution on the cornea of residual irregular astigmatism which could not be corrected with conventional eye glasses or contact lenses, the discovery that it is possible with the present invention that utilizes wave-front sensor information to exhibit an effective corrective effect even on this residual irregular astigmatism as a ready-made contact lens by setting a specific power distribution has great technical significance.

In regards to the latter point, with a contact lens for which it is not possible to completely prevent movement on the cornea of the eye, when the residual irregular astigmatism is measured with high precision using a wave-front sensor or the like for each individual and completely matching characteristics are given, we found there is a tendency for the vision quality to be unstable due to displacement of the contact lens on the cornea. We were able to confirm that in comparison to this case, there were better results with vision quality stability, and thus the corrective effect on residual irregular astigmatism with, as previously described, contact lenses with optical characteristics that are roughly correlated, without perfectly correlating to the residual irregular astigmatism for each individual. This is thought to be because vision quality cannot be captured with a simple analysis of the optical system of the eye, and relates to the visual adaptation mechanism of the human eye with which signals obtained with the optical system of the eye are processed in the brain, and is also thought to have a part in common with the technology noted for example in Patent Document 1 proposed previously by this applicant. The areas based on this brain processing cannot be put into numerical value form even with a wave-front sensor, and must be based on the subjective judgment of the patient, but they can be confirmed using statistics.

Also, by setting a positive lens power on one side on the special radial line, and setting a negative lens power on the other side, it is possible to realize an effective corrective effect on irregular astigmatism due to the high order aberration that is the target, while avoiding the wearing comfort worsening by suppressing the maximum thickness dimension of the contact lens.

Meanwhile, the contact lens for correction of irregular astigmatism of the present invention is not an item that substantially corrects the cornea shape using a lacrimal lens as with the hard contact lens of the conventional structure, so it is desirable to realize this using a conventional hydrogel soft contact lens or silicone hydrogel soft contact lens, and by doing that, prescriptions are significantly easier, making it possible to achieve significantly better wearing comfort with a great reduction in the irritation of wearing hard contact lenses.

Note that as the "positioning mechanism" with this mode, it is possible to use any conventionally known structure for which it is possible to set the circumferential rest position during wearing of contact lenses using gravity, eyelid pressure or the like, and in specific terms, it is possible to use a prism ballast or slab-off or the like as the positioning mechanism.

Also, for the "asymmetrical power difference due to irregular astigmatism" of this mode, it is an item for which the lens power (refractive power) of the optical system of the eye on the cornea represents a distribution mode which, with irregular astigmatism, does not have point symmetry such as with myopia and hyperopia, and does not have line symmetry such as with astigmatism. Then, the asymmetrical power difference due to irregular astigmatism includes differences due to a conical cornea as well as differences that, after ophthalmic surgery such as for wearing an intraocular lens (IOL) or corneal refraction correction (LASIK) or the like, occur due to tilted arrangement of the intraocular lens, eccentricity of the corneal refraction correction disposition position or the like. It also includes differences which occur due to abnormality of the corneal posterior surface shape after correction of the conical cornea using a hard contact lens due to excessive correction of the irregular astigmatism due to the corneal surface shape by the hard contact lens. Also, irregular astigmatism due to any of such high order aberration is also an item with optical characteristics having roughly the same tendencies, so it is possible to exhibit the same corrective effect using a contact lens having a structure according to the present invention.

Furthermore, the "central portion of each correction area for which the maximum or minimum lens power is set" with this mode means the part excluding the outer peripheral edge of each correction area, and does not mean the mathematical geometric center of each correction area, but rather means the position separated from the outer peripheral edge of each correction area toward the center side.

The second mode of the present invention is the contact lens for correction of irregular astigmatism constituted according to the first mode, wherein the special radial line extends in a vertical direction at the circumferential rest position of the contact lens specified by the positioning mechanism.

The contact lens of this mode is especially good for correction of irregular astigmatism due to a conical cornea. This is probably because many cases of residual irregular astigmatism are due to conical cornea, and based on our finding through statistics, a common tendency with irregular astigmatism due to conical cornea is that a bulging part occurs at the bottom side of the eye due to the conical cornea, a vertical direction asymmetrical power difference occurs, and comatic aberration occurs especially easily as a high order aberration that is measured with a wave-front sensor.

As the "radial line extending in the vertical direction" with this mode, this is not limited to being strictly a vertical line, and is acceptable as long as it extends in a vertical direction, and in specific terms, is recognized as an item for which a tilt of less than 45 degrees at both sides of the periphery in relation to a vertical line extends vertically rather than laterally.

The third mode of the present invention is the contact lens for correction of irregular astigmatism constituted according to the second mode, wherein on the special radial line, the positive correction area is provided on a top side, and the negative correction area is provided on a bottom side.

The contact lens of this mode can be even more suitably used for correction of irregular astigmatism caused by a conical cornea. Since the bulging part due to the conical cornea occurs at the bottom side of the eye statistically, by setting the positive correction area on the top side of the contact lens and the negative correction area on the bottom side, it is probably possible to exhibit an even more effective corrective effect on irregular astigmatism based on their relative lens power difference.

The fourth mode of the present invention is the contact lens for correction of irregular astigmatism constituted according to any of the first to third modes, wherein on the special radial line, the positive correction area and the negative correction area are formed having lens powers that change smoothly.

In specific terms, the design is such that the lens power changes extending across the entire length of the special radial line are expressed by a quadratic curve, a cubic curve, a curved line expressed using a polynomial expression, a sine curve or the like, or some combination of these, and this is used to further improve vision quality. Changing smoothly means, when considering all points on the line representing the lens power changes to be connection points, there are common tangents at all of those connection points, and the change mode does not include the bending point at which two tangents exist. Even more preferably, by having the lens power change using common tangents also for the connection sites of the positive lens area and the negative lens area, the lens power is set to change smoothly across the entirety on the special radial line.

The fifth mode of the present invention is the contact lens for correction of irregular astigmatism constituted according to any of the first to fourth modes, wherein the asymmetrical power difference is an asymmetrical power difference due to a conical cornea, and the lens is used for correction of irregular astigmatism due to the asymmetrical power difference.

With this mode, focusing on the fact that there are many comatic aberrations among high order aberrations for which asymmetrical power differences due to a conical cornea are measured using a wave-front sensor, this provides a contact lens that can do effective correction especially on irregular astigmatism due to a conical cornea. Among these, especially when combined with the third mode, this can be suitably provided as a contact lens exhibiting an effective corrective effect for vertical comatic aberration.

The sixth mode of the present invention is a contact lens for correction of irregular astigmatism constituted according to any of the first to fifth modes, wherein sandwiching the orthogonal radial line in relation to the special radial line, one half cycle side is used as the positive correction area, and another half cycle side is used as the negative correction area.

The contact lens of this mode is able to exhibit an effective corrective effect on typical symptoms with a conical cornea occurring in one of the half cycle areas of the cornea.

The seventh mode of the present invention is a contact lens for correction of irregular astigmatism constituted according to any of the first to fifth modes, wherein by forming either of the positive correction area or the negative correction area expanding from one half cycle side to the other half cycle side beyond the orthogonal radial line in relation to the special radial line, relative sizes of the positive correction area and the negative correction area differ.

The contact lens of this mode, in addition to exhibiting an effective corrective effect on symptoms for which a conical cornea occurs close to the outer peripheral edge of the cornea, also exhibits an effective corrective effect when the stable position of a contact lens for correction of irregular astigmatism worn on an average conical cornea is positioned greatly upward or downward from the cornea center.

The eighth mode of the present invention is a contact lens for correction of irregular astigmatism constituted according to any of the first to seventh modes, wherein at least one of the maximum lens power of the positive correction area and the minimum lens power of the negative correction area is set on the special radial line, and at a position away from a center of the positive correction area and the negative correction area.

With the contact lens of this mode, the extreme value point of the positive correction area or the negative correction area (maximum lens power position in the positive correction area or minimum lens power position in the negative correction area) can be set corresponding to the optical characteristics of the eye the lens is worn in, in the lens radial direction.

The ninth mode of the present invention is a contact lens for correction of irregular astigmatism constituted according to any of the first to eighth modes, wherein the maximum lens power of the positive correction area and the minimum lens power of the negative correction area are both set at positions having a separation distance of 0.5 to 2.5 mm from a lens geometric center.

With the contact lens of this mode, from the statistical study results and the like of conical cornea cases, this is especially suitable for correction of irregular astigmatism due to a conical cornea.

The tenth mode of the present invention is a contact lens for correction of irregular astigmatism constituted according to any of the first to ninth modes, wherein the absolute value of the maximum lens power of the positive correction area and the absolute value of the minimum lens power of the negative correction area are the same as each other.

With the contact lens of this mode, it is possible to obtain an effective corrective effect on comatic aberration due to a conical cornea while avoiding having an adverse effect on other aberrations.

The eleventh mode of the present invention is a contact lens for correction of irregular astigmatism constituted according to any of the first to tenth modes, wherein the lens is constituted in combination with eye glasses equipped with lenses for correcting low order aberration refractive errors through a spherical lens power (myopia, hyperopia, and presbyopia) and a cylindrical lens power (astigmatism), and corrects an optical system of eyes in cooperation with those eye glasses.

With this mode, in addition to correcting high order aberration which is an asymmetrical power difference due to irregular astigmatism using a contact lens, by also correcting low order aberrations with eye glasses, it is possible to realize combined lenses that exhibit a high corrective effect overall (in cooperation) on refractive errors of the eyes. In particular, the lenses of the eye glasses do not require corrective action on the high order aberration, and because of that, it is possible to use an item for which a combination of the conventionally well-known spherical lens power (myopia, hyperopia, and presbyopia) and cylindrical lens power (astigmatism) is set according to necessity. Then, by combining with conventionally offered eye glasses in this way, and using contact lenses with a special constitution according to the present invention, it is possible to avoid setting a plurality of standards and making a more complex manufacturing due to adding a correction function for low order aberrations to the contact lens, so it is possible to enhance the standards for correcting the irregular astigmatism by that amount, and it becomes possible to realize efficiently, practically, and at a low cost a corrective optical system for the eyes that is able to exhibit an effective corrective effect.

The twelfth mode of the present invention is a contact lens for correction of irregular astigmatism constituted according to any of the first to tenth modes, wherein the lens is constituted by combining with a hard contact lens for correcting low order aberration refractive errors through a spherical lens power (myopia, hyperopia, and presbyopia), and corrects the optical system of the eyes in cooperation with the hard contact lens.

With this mode, in addition to correcting high order aberrations which are asymmetrical power differences due to irregular astigmatism with a contact lens for correction of irregular astigmatism, by correcting low order aberrations with a hard contact lens, it is possible to realize a combined lens that exhibits a high corrective effect overall (in cooperation) on refractive errors of the eyes. When corrected using conventional hard contact lenses, residual irregular astigmatism newly appears due to the corneal posterior surface shape by overcorrection of irregular astigmatism due to the corneal surface shape. In light of that, by wearing a contact lens for correction of irregular astigmatism in piggyback form from above the hard contact lens or under the hard contact lens (in cooperation with the hard contact lens), it is possible to realize a combined lens that exhibits a high corrective effect overall on refractive errors of the eyes. At that time, a soft contact lens is suitable as the contact lens for correction of irregular astigmatism of the present invention. Also, when used in a state with two contact lenses overlapping in piggyback form, the contact lens for correction of irregular astigmatism and the hard contact lens may be adhered to each other in advance, or may also be worn as is as separate items from each other. In particular, with the hard contact lens, high order aberration correction action is not required, and because of that, it is possible to use an item for which a combination with the conventionally well-known spherical lens power (myopia, hyperopia, and presbyopia) is set as needed. Then, by using the contact lens for correction of irregular astigmatism of the special constitution according to the present invention in combination with a conventionally offered hard contact lens in this way, it is possible to avoid setting a plurality of standards and making more complex manufacturing due to adding a low order aberration correction function to the contact lens for correction of irregular astigmatism, so it is possible to enhance the standard for correcting the irregular astigmatism by that amount, and it is possible to realize efficiently, practically, and at a low cost a corrective optical system of the eye that exhibits an effective corrective effect.

The thirteenth mode of the present invention is a contact lens for correction of irregular astigmatism constituted according to any of the first to tenth modes, wherein the lens has optical characteristics for correcting low order aberration refractive errors through a spherical lens power (myopia, hyperopia, and presbyopia) and a cylindrical lens power (astigmatism).

With this mode, without requiring a separate corrective optical system such as eye glasses, it is possible to provide a corrective optical system of the eyes which can exhibit an effective corrective effect simply by using the contact lens, on not only low order aberrations of the eyes such as myopia, hyperopia, and presbyopia, but also high order aberrations of the eyes that could not be handled conventionally as residual irregular astigmatism. With the contact lens of this mode, for example in addition to setting an optical surface that exhibits a corrective effect for both low order aberrations and high order aberrations for either one of the front or back surface of the lens, it is also possible to set an optical surface that exhibits a corrective effect on low order aberrations for one of the front surface or back surface of the lens while setting an optical surface that exhibits a corrective effect on high order aberrations on the other.

The fourteenth mode of the present invention is a contact lens combination series for which a plurality of contact lenses having mutually different asymmetrical power distributions are combined together, characterized in that: in each of the contact lenses, a positioning mechanism for specifying a circumferential rest position of the contact lens in a worn state is provided, and a positive correction area using a positive lens power is provided on one side on a special radial line at the circumferential rest position specified by the positioning mechanism, while a negative correction area using a negative lens power is provided at another side on the special radial line, and the positive lens power of the positive correction area and the negative lens power of the negative correction area of the respective contact lenses are different at a plurality of stages so that the contact lenses are provided as the contact lenses for correction of irregular astigmatism that combines together items set with mutually different optical characteristics.

A contact lens combination series using the structure according to this mode, specifically, a combination structure of specific lenses which are materials, can be understood as a contact lens set which combines a plurality of contact lenses having mutually different optical characteristics. Then, by providing to the market this kind of contact lens combination series, the same as with conventional myopia correction contact lenses or the like, simply by applying according to the patient a non-customer order contact lens for which a plurality of types of optical characteristics are set in advance, it is possible to provide a contact lens which can exhibit a good corrective effect on residual irregular astigmatism which could not be handled in the past. Especially with this mode, it is very significant that it is possible to provide at a practical level a contact lens that exhibits an effective corrective effect on residual irregular astigmatism using an industrial manufacturing method and a fitting method that does not require high level on site knowledge or machining.

The fifteenth embodiment of the present invention is a contact lens combination series constituted according to the fourteenth mode, wherein optical characteristics for the respective contact lenses are made to be different by making a difference between a maximum value of the positive lens power of the positive correction area and a minimum value of the negative lens power of the negative correction area different at a plurality of stages for every two diopters.

According to this mode, it is possible to realize an effective corrective effect on residual irregular astigmatism for many patients while suppressing the contact lenses combined together to a suitable number.

The sixteenth mode of the present invention is a contact lens combination series constituted according to the fourteenth or fifteenth mode, wherein at each stage for which the positive lens power of the positive correction area and the negative lens power of the negative correction area are made different at a plurality of stages, mutually different optical characteristics are further set by making a position of a maximum lens power of the positive correction area and a position of a minimum lens power of the negative correction area different at a plurality of stages from a lens geometric center on the special radial line.

According to this mode, it is possible to provide a contact lens included in a combination series that exhibits a more effective corrective effect for residual irregular astigmatism for each patient according to the number of positions of extreme values respectively set at the positive correction area and the negative correction area.

The seventeenth mode of the present invention is a contact lens combination series constituted according to any of the fourteenth to sixteenth modes, wherein at each stage for which the positive lens power of the positive correction area and the negative lens power of the negative correction area are made different at a plurality of stages, mutually different optical characteristics are further set by making a position of the special radial line in a circumferential direction in relation to a vertical direction at the circumferential rest position of the contact lens specified by the positioning mechanism different at a plurality of stages.

According to this mode, for example even if the position at which the conical cornea occurs on the cornea (position recognized as the apex) is different in the circumferential direction for each patient, it is possible to provide a combination series of contact lenses that exhibit a more effective corrective effect on residual irregular astigmatism for each patient.

Effect of the Invention

According to the present invention, it is possible to efficiently provide a contact lens that can exhibit a good corrective effect even on irregular astigmatism due to a conical cornea or the like that could not be corrected with conventional eye glasses or contact lenses (residual irregular astigmatism) without relying on custom orders for each wearer, and using a new structure that is practical and can be industrially mass produced. Also, especially with the contact lens combination series constituted according the present invention, it is possible to produce a suitable contact lens for correction for many patients with irregular astigmatism due to a conical cornea or the like at a low cost, with easy fitting, and more efficiently.

EMBODIMENTS FOR CARRYING OUT THE INVENTION

Figure 1:
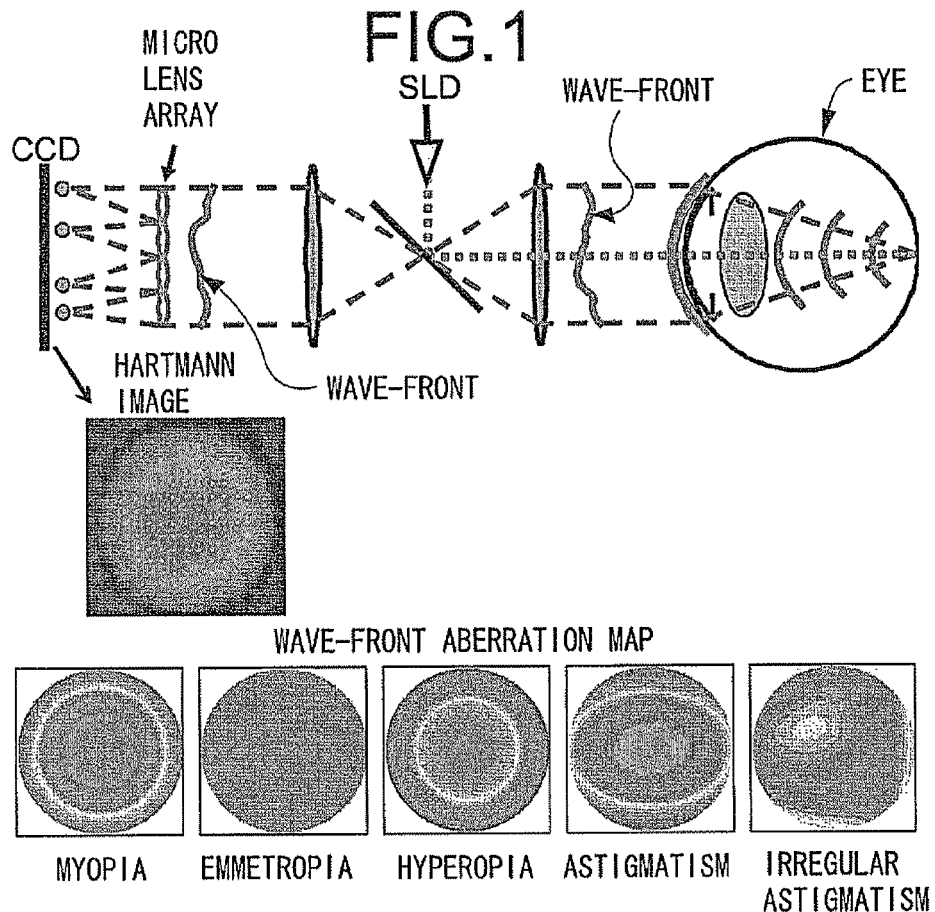
FIG. 1 is an explanatory drawing showing the principle of a wave-front sensor.

Following, we will describe embodiments of the present invention while referring to the drawings.

To start, the wave-front sensor itself is already well known, but since the present invention is an item that uses information obtained with a wave-front sensor not only when obtaining basic findings of the present invention, but also when confirming the effects of the present invention, we will give a summary description of the principle of the wave-front sensor and the obtained information to make the present invention easier to understand.

Specifically, the refractive states of the optical system of the eyes, including the spherical power and astigmatic power (including astigmatic axis) that can be corrected with eye glasses, and irregular astigmatism that cannot be completely corrected with eye glasses, can all be expressed with the concept of wave-front aberration. When parallel light rays emitted from each point on a surface orthogonal to the optical axis are converged on the retina via the optical system of the eyes which is the cornea and the lens, the state of not converging on the same point but rather being displaced on the optical axis is called an aberration. Also, the light emitted from each point is thought to form a surface overall and advance toward the optical axis direction, so the surface of the light at each instant is called a wave-front. Then, ideally, with an ideal wave-front with no aberration as a standard, a state for which the wave-front has been displaced by the existence of an aberration is called wave-front aberration, and it is possible to measure wave-front aberration including all of these refractive states using a wave-front sensor. Also, with the wave-front sensor, by analyzing the obtained wave-front aberration information using the wave-front sensor, it is possible to put the wave-front aberration into numerical value form (displayed with root-mean-square (RMS)), use Zernike polynomials to break down into a plurality of wave-front elements and divide and put into numerical value form the wave-front aberration elements that can be corrected with eye glasses (low order aberrations: spherical, astigmatism) and wave-front aberration elements that cannot be corrected with eye glasses (high order aberrations: somatic aberration, spherical aberration, etc.) and the like, and it is also possible to display an image of the patient's retina as a simulation optical image.

Figure 2:
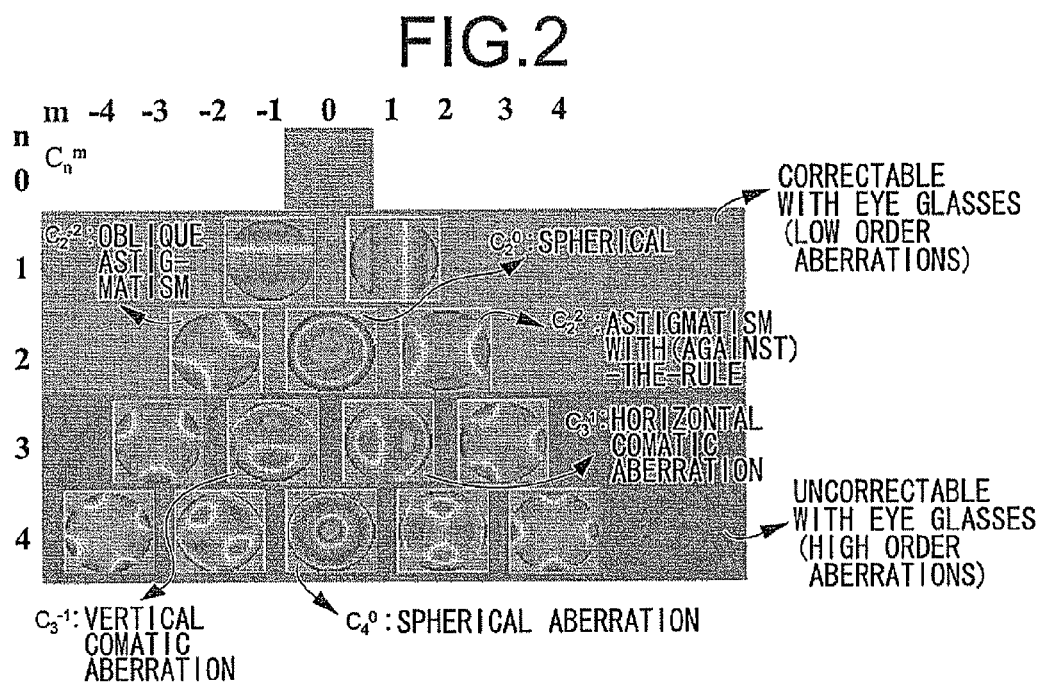
FIG. 2 is an explanatory drawing showing an example of an image of each aberration obtained by arithmetic processing using Zernike polynomials from information acquired by the wave-front sensor.

Incidentally, for reference, FIG. 1 shows the principle of the wave-front sensor together with a Hartmann image obtained thereby and a wave-front aberration map. In FIG. 1, the SLD (light emitting diode) is the light source for measurement. Also, FIG. 2 shows an explanatory drawing that makes it possible to understand as an image using the wave-front aberration map the aberration represented by each order obtained by using Zernike polynomials to break down into a plurality of wave-front elements the wave-front aberration information obtained by the wave-front sensor.

Figure 3:
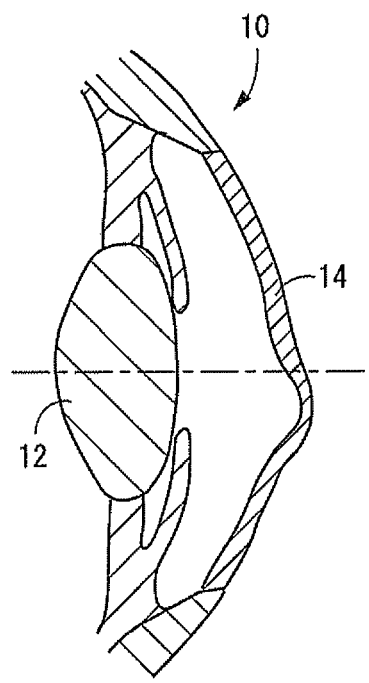
FIG. 3 is an explanatory model diagram showing an enlarged vertical cross section of an eye showing symptoms of a conical cornea.

Meanwhile, FIG. 3 shows the typical symptoms of a conical cornea that is the main cause of high order aberration that is the subject of the present invention as a vertical cross section view of the eye. As shown in this FIG. 3, the conical cornea is a symptom for which there are steepened sites localized on a cornea 14 with the cornea 14 positioned to the front of a lens 12 in an eye 10 projecting to the front along in association with thinning. With an eye which has resulted in such a conical cornea, an asymmetrical power difference occurs as irregular astigmatism, and with the aberration analysis results using the wave-front sensor, of the third to fourth order high order aberrations in the Zernike polynomials pyramid shown in the aforementioned FIG. 2, the comatic aberration represented by third order coefficients $C_3^{-1}$ and $C_3^1$ are the high values. For these vertical comatic aberrations represented by the $C_3^{-1}$ coefficient and the horizontal comatic aberrations represented by the $C_3^1$ coefficient, it is possible to understand the size level and the direction of the comatic aberrations as a vector coefficient, which is vector synthesized with these.

However, when we consider the cornea shape shown in FIG. 3, the occurrence of a comatic aberration due to a conical cornea is thought to be due to the wave-front becoming slower with the steepening of a specific site (lower part in FIG. 3) of the cornea 14 due to a conical cornea, and to the wave-front become relatively faster at the top. Also, according to the measurement data of many conical cornea patients, with a corneal front view image which has the optical axis of the eye as the origin point, on a coordinate turning left at the origin point which uses the horizontal line extending to the nose side as 0 degrees, it was found that the distribution of comatic aberration is high toward the top from the origin point which is approximately 90 degrees. This correlates to finding many steepening sites positioned at roughly the vertical bottom from the center of the cornea in patients with conical cornea.

Figure 4:
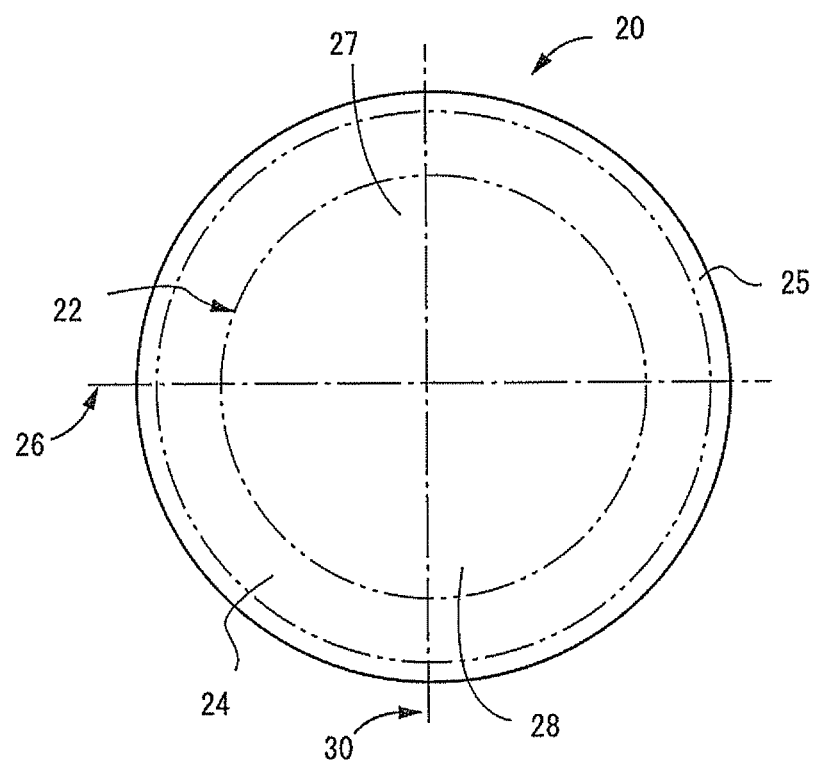
FIG. 4 is a front view showing a contact lens for correction of irregular astigmatism as an embodiment of the present invention.

Here, a contact lens for correction of irregular astigmatism 20 according to the present invention is provided as a soft contact lens as shown in FIG. 4. This contact lens 20 is manufactured using a conventionally known soft contact lens material such as PHEMA, PVP, silicone hydrogel or the like, using a conventionally known method such as molding, lathe cutting or the like.

Also, the basic shape of the contact lens for correction of irregular astigmatism 20, the same as with well-known soft contact lenses from the past, is set having a suitable base curve (BC) given to the lens back surface and having a suitable lens diameter (DIA) considering the shape and size of the cornea of the eye of the wearer. Also, in addition to the lens front surface shape being set so as to satisfy the minimum lens thickness, a conventionally known peripheral part 24 and edge part 25 are formed at the periphery of an optical part 22 of the center that provides the optical system so as to obtain good wearing comfort and wearing stability. Each of the aforementioned BC and DIA values is preferably set and prepared at a plurality of stages at predetermined intervals so as to be able to handle individual differences.

Furthermore, on this contact lens for correction of irregular astigmatism 20, as a circumferential rest positioning mechanism, a prism ballast structure which uses gravity may be used, for example, with a prism set in one radial direction in relation to the overall lens and having the thickness dimensions differ, and by forming a gravity action part that is thick at one location on the periphery for which the thickness dimensions of the peripheral part are made to differ in the circumferential direction. Alternatively, at parts positioned at both the lens top and bottom sides, by making the peripheral part thickness dimension gradually thinner toward the radial direction outside, cutting the peripheral part outer edge part in roughly the horizontal direction or the like, a slab-off structure using eyelid lens contact pressure may be used. In other words, by using this kind of circumferential rest positioning mechanism, when wearing the contact lens for correction of irregular astigmatism 20, in a state with the up-down direction in FIG. 4 as the vertical direction, it is possible to obtain stable positioning on the cornea.

Then, with the aforementioned optical part 22 provided on the central portion, in a state with the lens worn with the circumferential rest position specified by the circumferential rest positioning mechanism (the state represented by the front view in FIG. 4), mutually different optical characteristics are given to the top side area and the bottom side area sandwiching a horizontal direction line 26 that passes through the optical axis center. In specific terms, while the area more to the top side than the horizontal direction line 26 is used as a positive correction area 27 for which a positive lens power is set, the area more to the bottom side than the horizontal direction line 26 is used as a negative correction area 28 for which a negative lens power is set. In other words, with the contact lens for correction of irregular astigmatism 20 shown in FIG. 4, the vertical direction line through the optical axis is used as a special radial line 30, and the top side which is one side on this special radial line 30 is used as the positive correction area 27, and the bottom side which is the other side is used as the negative correction area 28.

In fact, for both the positive correction area 27 and the negative correction area 28, a fixed lens power is not set across the entirety, but rather lens powers that change with a specified pattern are set within each area 27 and 28.

Specifically, with the positive correction area 27, while a gradually changing positive lens power is set so as to gradually become larger from the outer peripheral edge part toward the central portion, with the negative correction area 28, a gradually changing negative lens power is set so as to gradually become smaller (the absolute value becomes larger) from the outer peripheral edge part toward the central portion. Especially with this embodiment, both the positive correction area 27 and the negative correction area 28 are formed having a linearly symmetrical lens shape and power distribution in relation to the special radial line 30, and both the maximum lens power setting center point for the positive correction area 27 and the minimum lens power setting center point for the negative correction area 28 are positioned on the special radial line 30.

Figure 5:
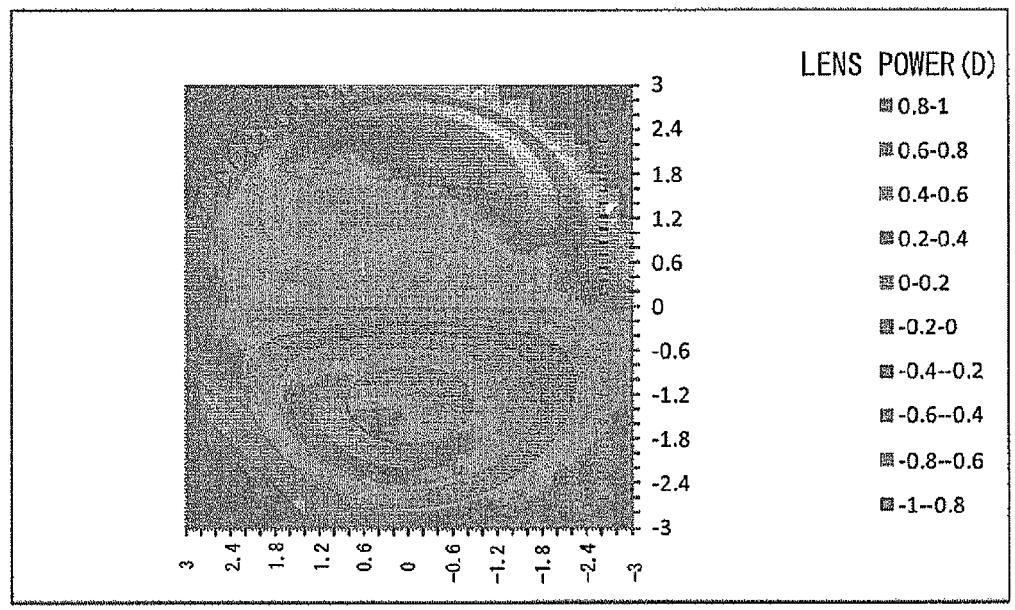
FIG. 5 is an explanatory drawing showing a lens power distribution with a contact lens for correction of irregular astigmatism as an embodiment of the present invention.

Also, with this embodiment, in the positive correction area 27 and the negative correction area 28, each extreme value point (the maximum lens power position in the positive correction area 27 or the minimum lens power position in the negative correction area 28) is positioned on the roughly geometric center point, and the lens power is made to change smoothly in the periphery with the extreme value points as the center. In specific terms, as shown in FIG. 5, with the contact lens for correction of irregular astigmatism 20 of this embodiment, the lens power distribution in the positive correction area 27 and the negative correction area 28, when respectively represented in contour line form overlapping positions of the same lens power range, the lens power distribution is represented using a contour line shape of a plurality of lines that are concentric in roughly a semicircle. In FIG. 5, the lens outer peripheral edge portion is non-linear, but this is simply a display error in terms of calculation.

Figure 6:
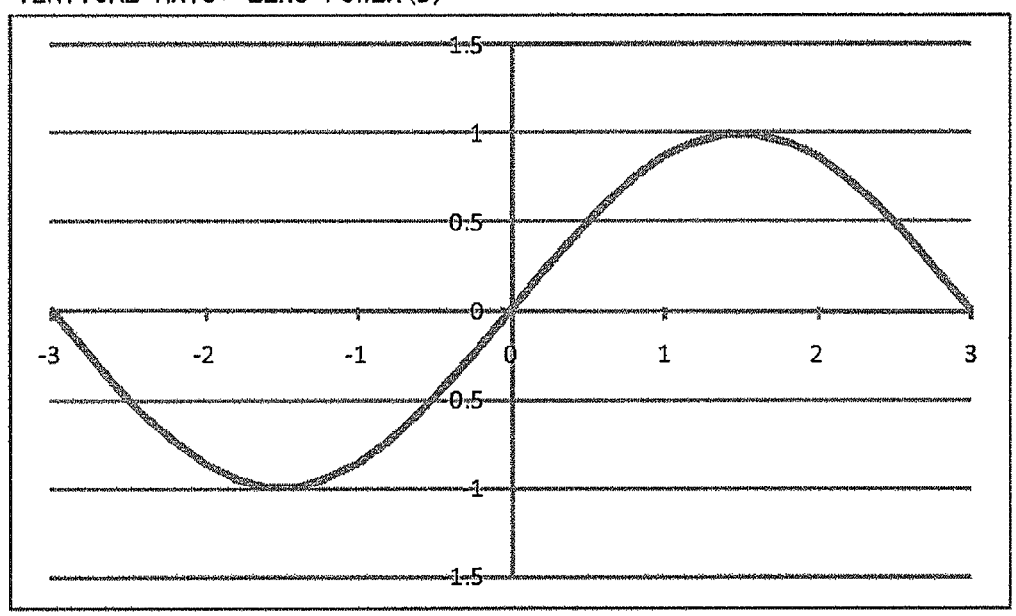
FIG. 6 is an explanatory drawing showing the lens power distribution shown in FIG. 5 in graph form on a special radial line.

Then, for both the positive correction area 27 and the negative correction area 28, the contour line intervals on the special radial line 30 are made to be roughly equal at both sides sandwiching the extreme value points, and by doing this, the extreme value points are set as roughly the centers of the positive correction area 27 and the negative correction area 28. Specifically, FIG. 6 represents the power distribution on the special radial line 30 as a graph, and as shown there, the lens power changes are set having a smooth change mode with no steps or break points across the entire positive correction area 27 and negative correction area 28. Especially with this embodiment, the power distribution on this special radial line 30 is set in the positive correction area 27 and the negative correction area 28 respectively as quadratic curves or sine wave curves, and those are connected using a common tangent on the optical axis of the optical part 22.

With the contact lens for correction of irregular astigmatism 20 of this embodiment for which this kind of power distribution is set with the optical part 22, by wearing this, as described previously, it is possible to obtain a corrective effect on irregular astigmatism due to a conical cornea of the eye 10 with a typical conical cornea for which there is a steep part due to thinning in the vertical downward direction of the cornea.

Incidentally, we will show one specific application example for reference. The patient was a 23 year old female found to have irregular astigmatism due to a conical cornea in the left eye. It was possible to obtain 0.7 for the corrected eyesight with only the low order aberration corrected using eye glasses, but the level of satisfaction by the patient herself with the vision quality was low. The eye glasses lens in this case was spherical lens power (S) −8.00 diopters (D), cylindrical lens power (C) −3.00 diopters (D), and axial direction angle (A) 0 degrees (horizontal direction).

The contact lens for correction of irregular astigmatism 20 shown with the embodiment described above was prescribed for this patient. With the prescribed contact lens for correction of irregular astigmatism 20, the positive correction area 27 extreme value was +3 diopters, and the negative correction area 28 extreme value was −3 diopters.

Then, in a state wearing this contact lens for correction of irregular astigmatism 20, eye glasses for correcting low order aberration were prescribed, and by wearing those eye glasses, it was possible to obtain corrected eyesight of 0.8, and the patient's level of satisfaction with the vision quality was high. The eye glasses lens in this case was S: −8.50 D, C: 3.00 D, and A: 5 degrees.

Also, to objectively confirm the prescription effect using this contact lens for correction of irregular astigmatism 20, using a wave-front sensor, measurement and analysis were performed for both the naked eye state and the state of wearing the contact lens for correction of irregular astigmatism 20. As a result, for the sum total value of the high order aberration that could not be corrected with the eye glasses lens, it was confirmed that wherein with the naked eye it was 0.93 μm (RMS), it was suppressed to 0.16 μm (RMS) when wearing the contact lens for correction of irregular astigmatism 20. For the value of the comatic aberration which is irregular astigmatism for which a conical cornea is a significant cause as well, with the naked eye, this was 0.76 μm (RMS) (axis: 100 degrees), wherein when wearing the contact lens for correction of irregular astigmatism 20, it was confirmed that this was suppressed to 0.10 μm (RMS) (axis: 325 degrees).

As the wave-front sensor, the KR-9000PW which is a Hartmann-Shack type wave-front sensor made by Topcon Co., Ltd. was used. This wave-front sensor is equipped with a program for doing vector synthesis of pairs of terms in Zernike polynomials and displaying this as one aberration (e.g. displaying as comatic aberration using vector synthesis of vertical comatic aberration and horizontal comatic aberration), and it is also possible to display distortion using a Hartmann image or a Landolt ring using retina image simulation.

Figure 7:
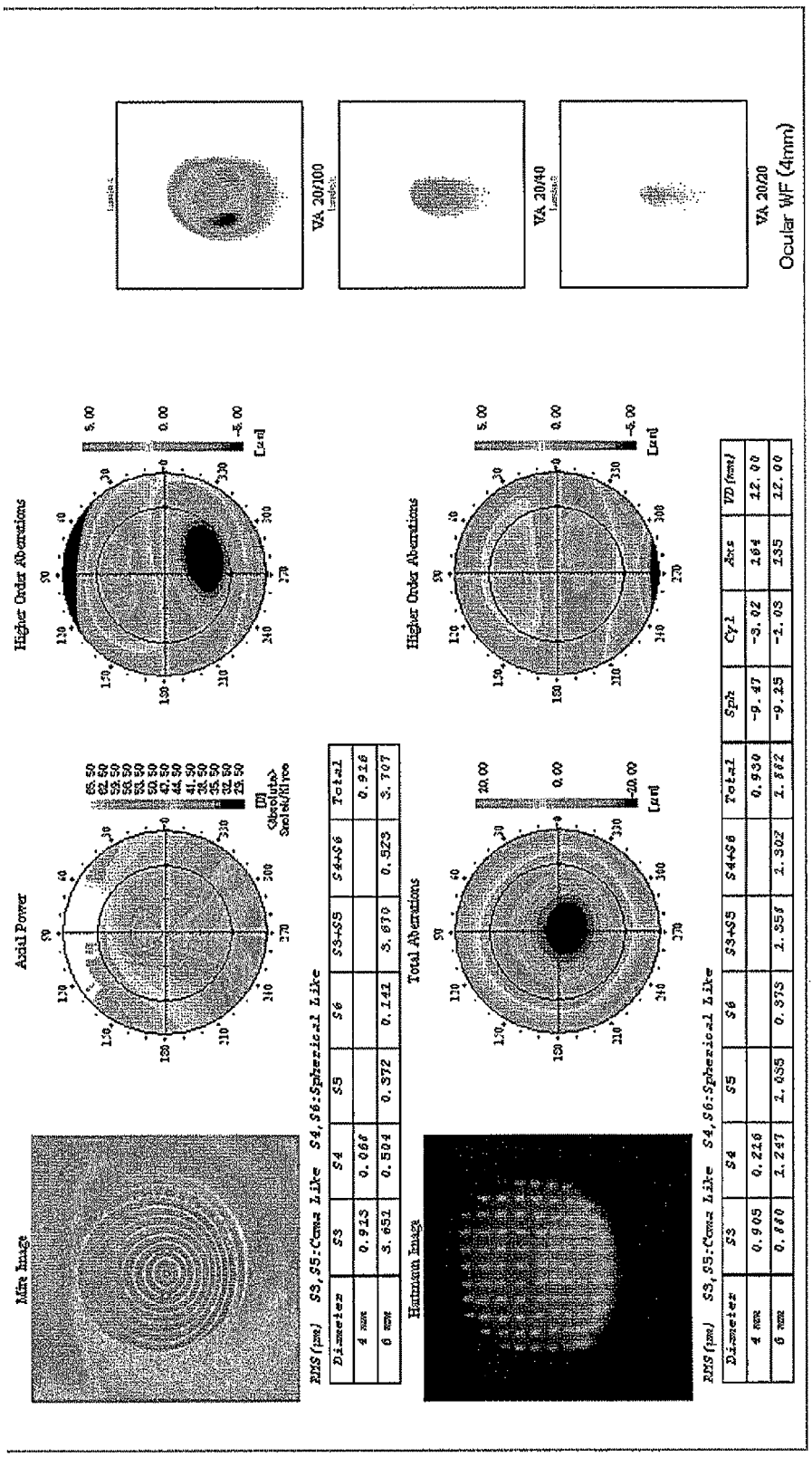
FIG. 7 shows a display screen showing a wave-front aberration map with the naked eye obtained using a wave-front sensor when a prescription has been made for a specific patient as an example of the present invention.
Figure 8:
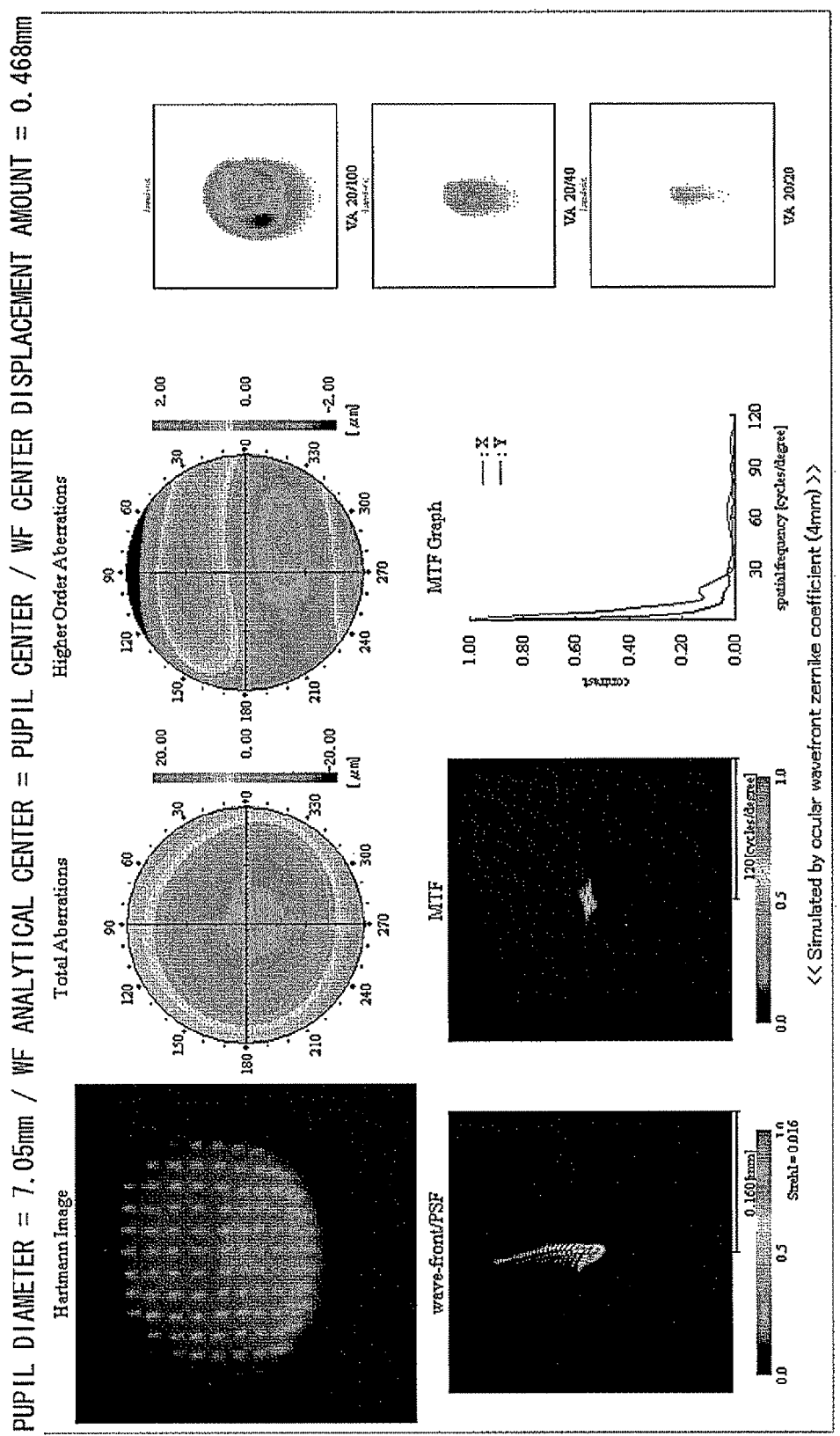
FIG. 8 shows a display screen showing the wave-front aberration, PSF, and MTF with the naked eye obtained in the same manner as the wave-front aberration map of FIG. 7.
Figure 9:
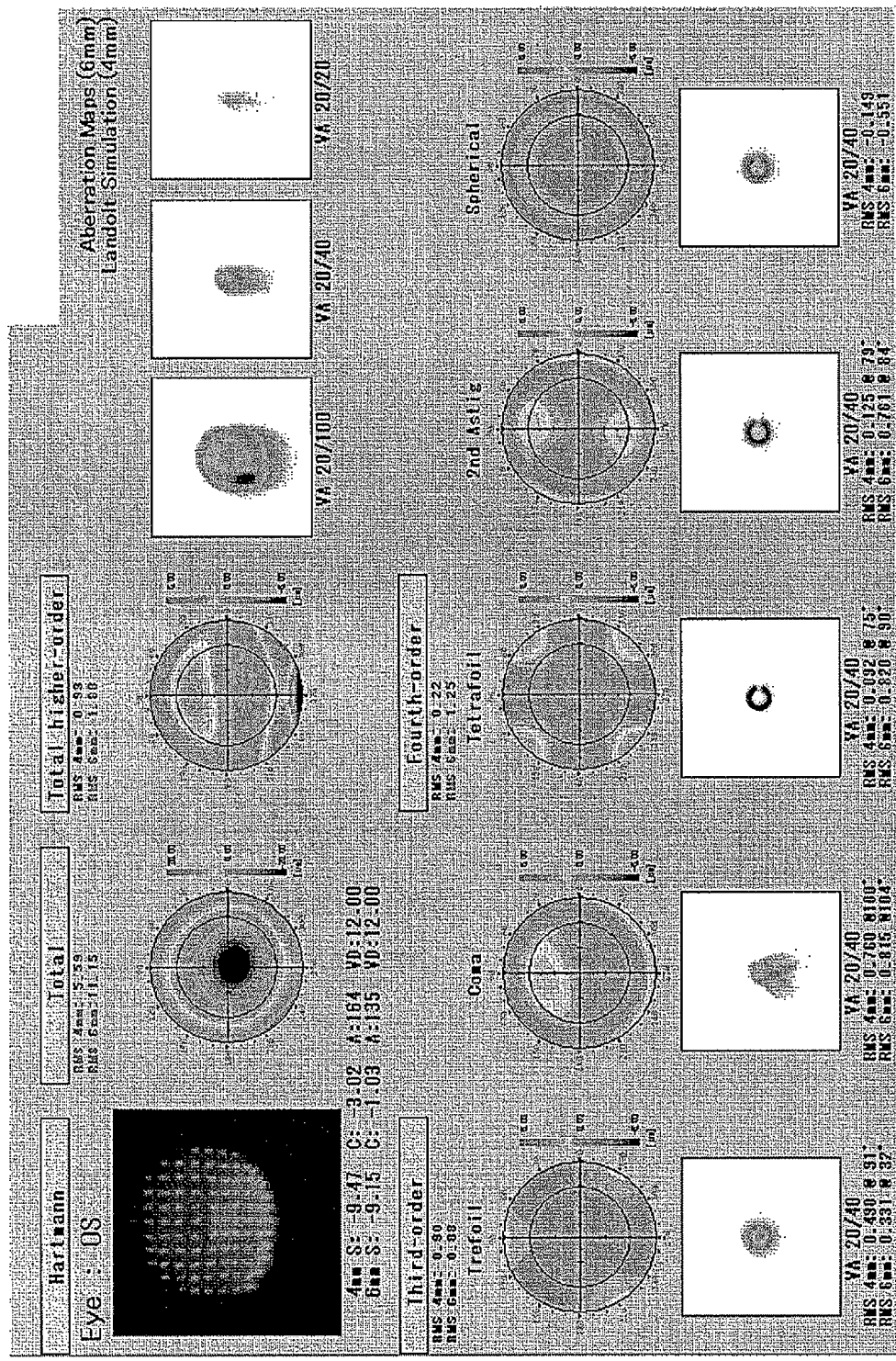
FIG. 9 shows a display screen showing a Zernike vector map with the naked eye obtained in the same manner as the wave-front aberration map of FIG. 7.
Figure 10:
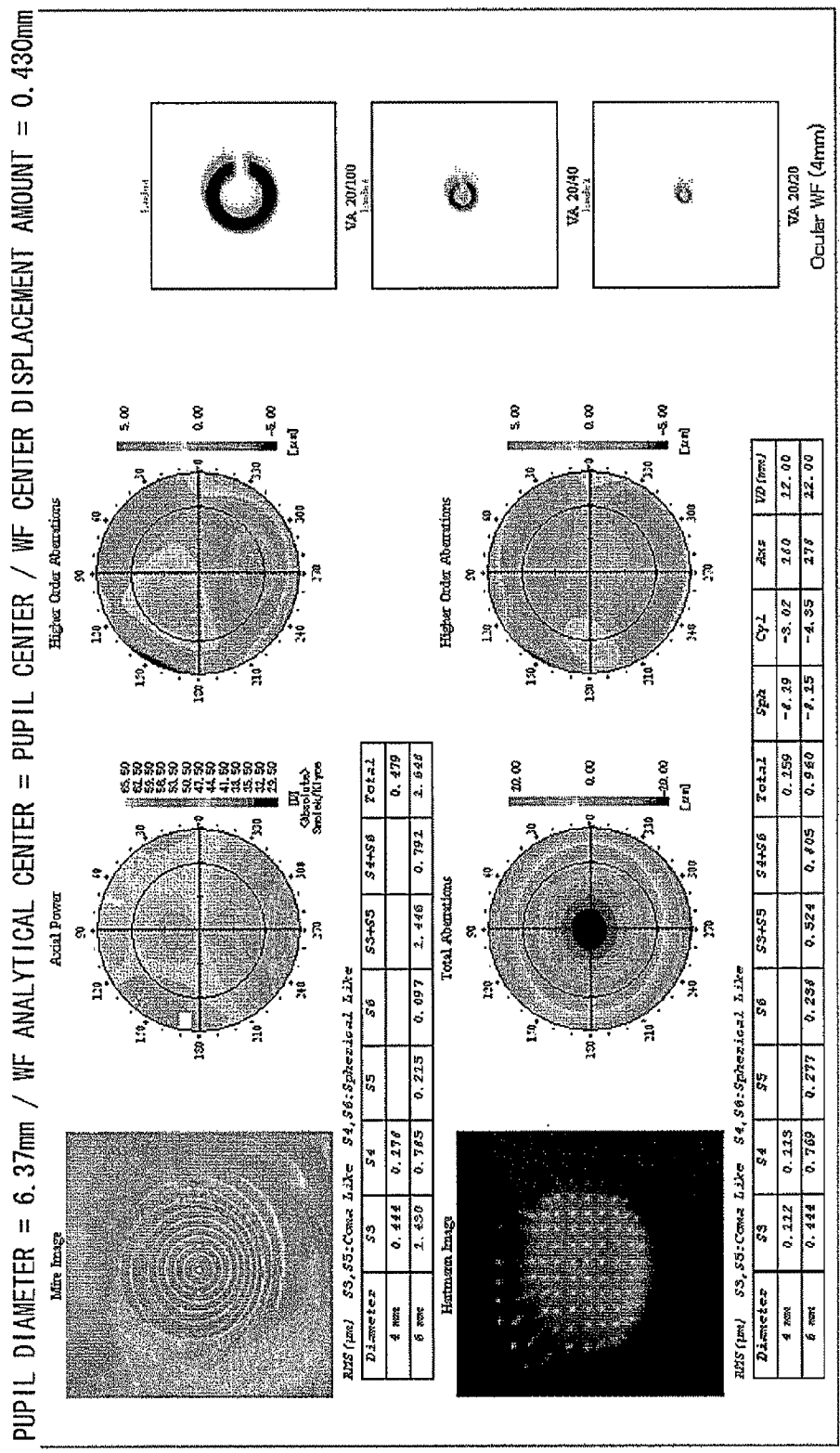
FIG. 10 shows a display screen corresponding to FIG. 7 showing the wave-front aberration map when wearing the contact lens for correction of irregular astigmatism.
Figure 11:
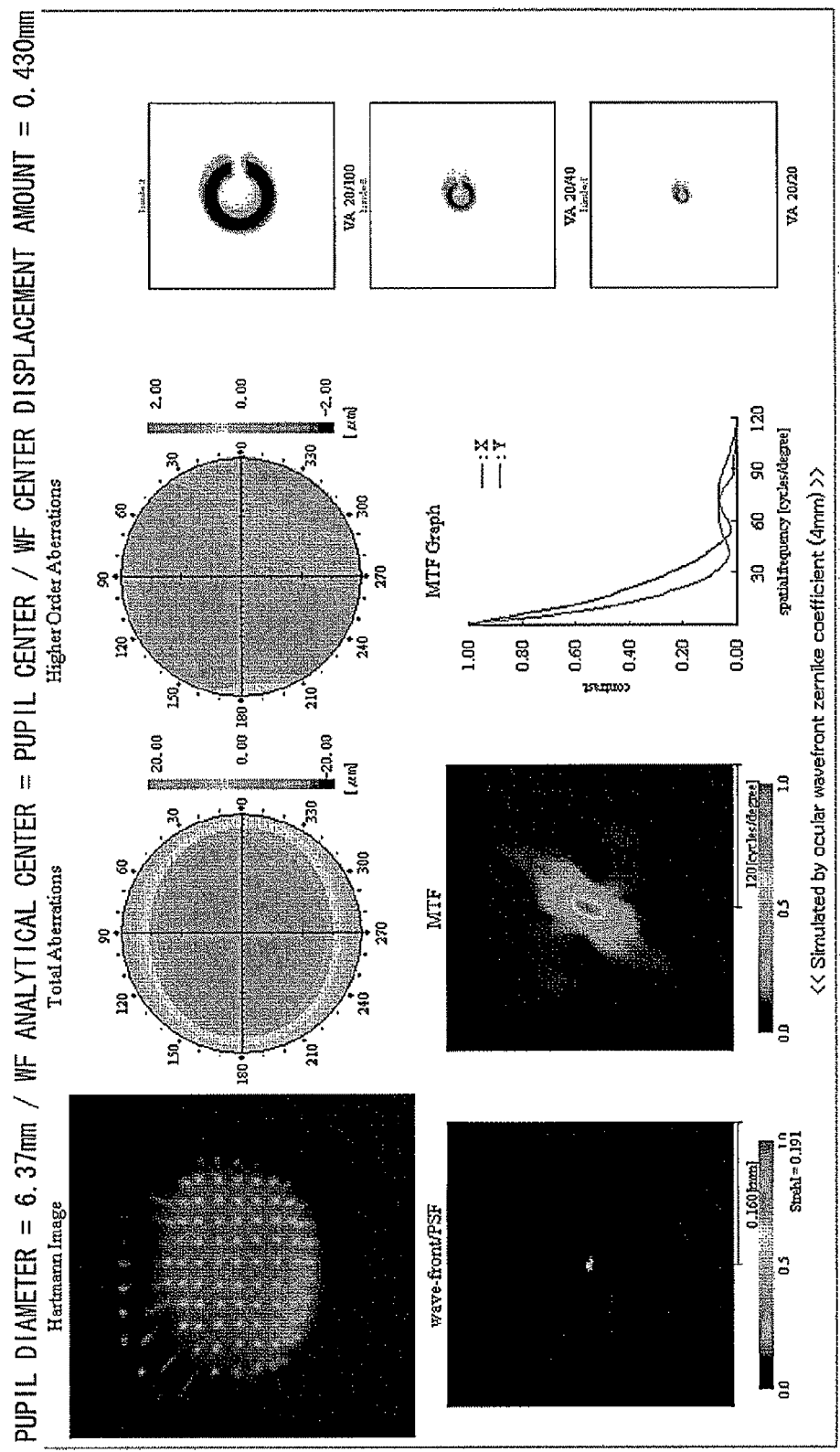
FIG. 11 shows a display screen corresponding to FIG. 8 showing the wave-front aberration, PSF, and MTF when wearing the contact lens for correction of irregular astigmatism.
Figure 12:
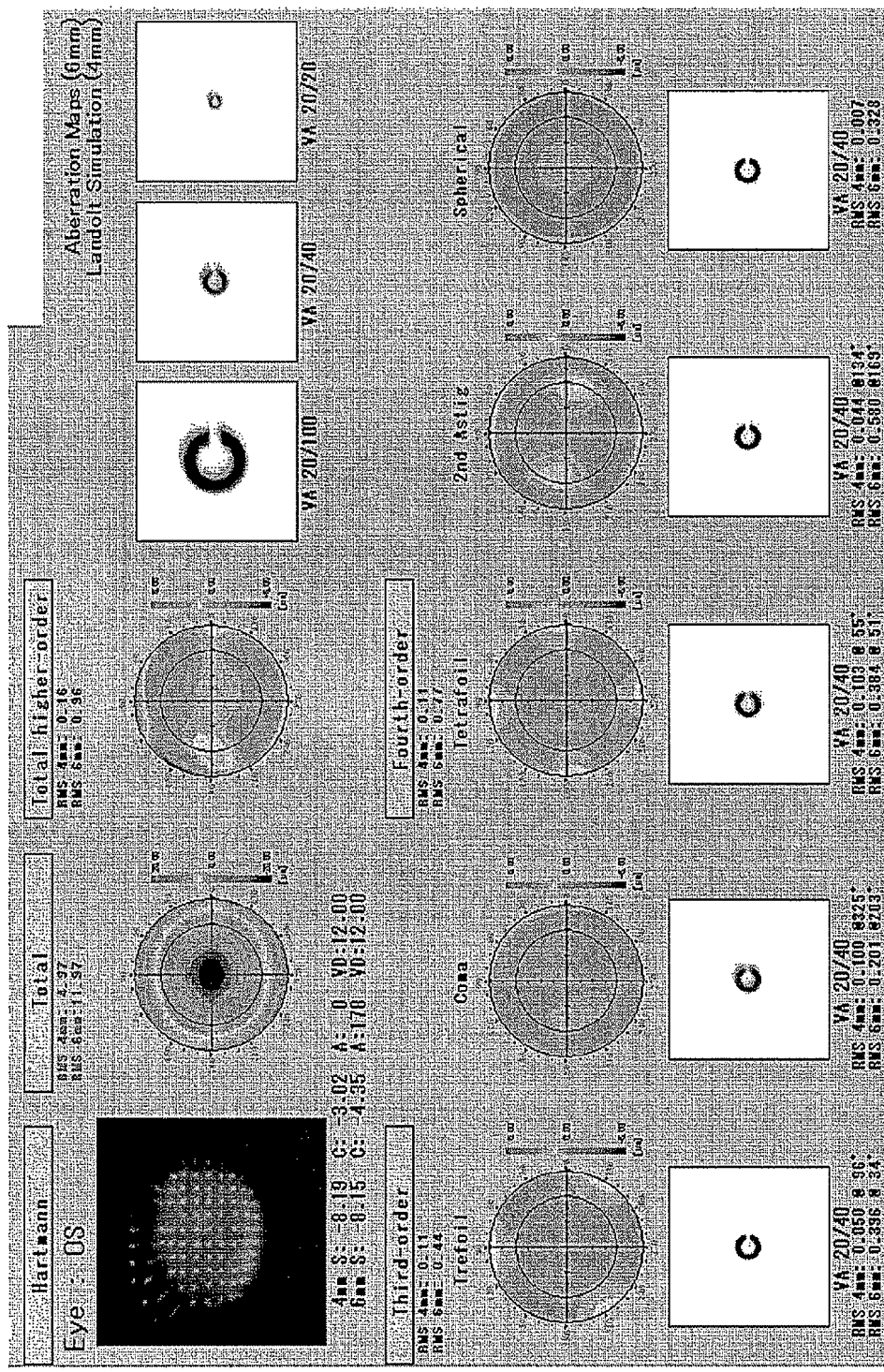
FIG. 12 shows a display screen corresponding to FIG. 9 showing a Zernike vector map when wearing the contact lens for correction of irregular astigmatism.
Figure 13:
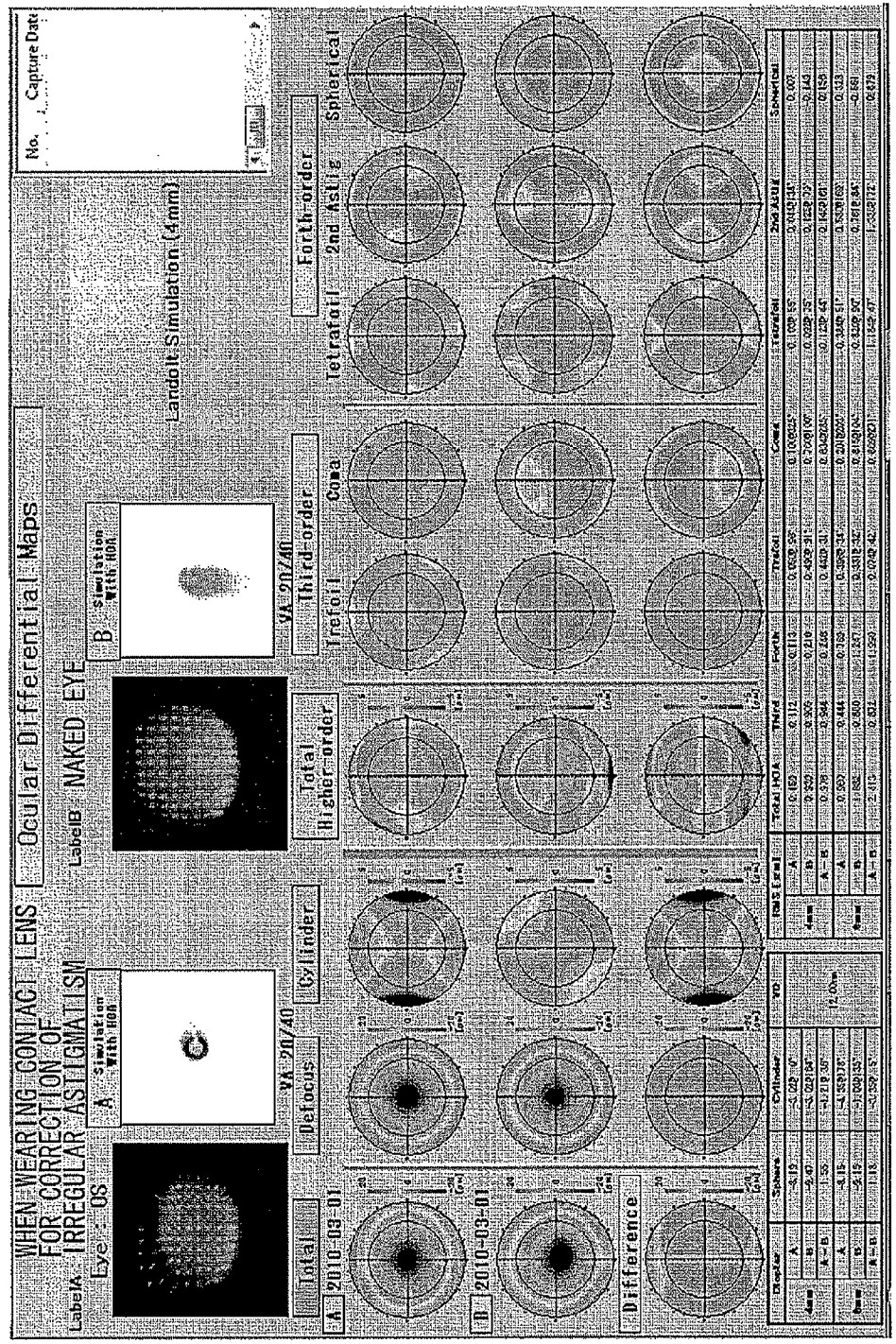
FIG. 13 shows a display screen of a wave-front sensor giving a comparative display of each Zernike vector map when wearing the contact lens for correction of irregular astigmatism (A in the drawing) and with the naked eye (B in the drawing).

For reference, as the information and analysis results by the wave-front sensor obtained with the prescription for the patient noted above, we will respectively show each display screen of a wave-front aberration map with the naked eye (FIG. 7), the wave-front aberration, PSF, and MTF (FIG. 8), and Zernike vector map (FIG. 9), and also in a state wearing the prescribed contact lens for correction of irregular astigmatism 20, each display screen for the wave-front aberration map (FIG. 10), the wave-front aberration, PSF, and MTF (FIG. 11), and the Zernike vector map (FIG. 12). Furthermore, FIG. 13 shows a screen with a comparison display of each Zernike vector map for the state wearing the contact lens for correction of irregular astigmatism 20 and the naked eye state. With the display screens shown in each drawing, also shown together is the Landolt ring by simulation of a retina image under the respective conditions.

From the measurement and analysis results shown in FIGS. 7 to 13 as well, we found that the high order aberrations that could not be corrected with conventional eye glasses and contact lenses can be effectively corrected by wearing the contact lens for correction of irregular astigmatism 20 constituted according to the present invention. In particular, the subject of this prescription was found to have comatic aberration with the naked eye in a direction skewed by 10 degrees in the circumferential direction from the vertical line around the optical axis of the eye, but it was confirmed that sufficient corrective effect was exhibited by wearing the contact lens for correction of irregular astigmatism 20 for which power distribution was implemented on the special radial line 30 extending in the vertical direction as described previously. This can also easily be understood from the fact that in the screen display shown in FIG. 13, the Landolt ring represented by a comet form for which the tail pulls downward with the naked eye (display inside the B frame representing the naked eye) is represented as a clear Landolt ring (display within the A frame) by wearing the contact lens for correction of irregular astigmatism 20.

Above, we gave a detailed description of the contact lens for correction of irregular astigmatism 20 as an embodiment of the present invention, but so as to be able to more efficiently, quickly and easily handle the fact that there are differences in irregular astigmatism symptoms for each patient they are prescribed for, it is preferable that this kind of contact lens for correction of irregular astigmatism 20 be manufactured and provided on the market as a contact lens combination series made into a set by arranging and combining a plurality of contact lenses for which different optical characteristics are set in advance at a plurality of stages.

For example, this is provided as a contact lens combination series for which there are items combined together for which mutually different optical characteristics are set by making the positive lens power of the positive correction area 27 and the negative lens power of the negative correction area 28 be different at a plurality of stages with the respective contact lenses.

In more specific terms, combined and provided as a series are items for which, for example, the maximum lens power of the positive correction area 27: $+\alpha$ and the minimum lens power of the negative correction area 28: $-\alpha$ values are set as $\alpha=1D$ (diopter), 2D, 3D, 4D, and 5D. As a result, items for which the power difference between the maximum lens power of the positive correction area 27 and the minimum lens power of the negative correction area 28 is set at 2D steps from 2D (standard ±1D) are provided as a set, and without custom ordering, it is possible to quickly provide the contact lens for correction of irregular astigmatism 20 for which a suitable power difference is set according to the status of the patient.

Also, similarly, it is also possible to provide as a series a combination of lenses which differ not only in lens power, but also in relative angle of the special radial line 30 in relation to the vertical direction line in the worn state which is set by the circumferential rest positioning mechanism. That is, in addition to lenses for which the relative angle is set as 0 degrees as with the first embodiment, it is possible to set lenses for which the relative angles are differentiated in a plurality of types by for example 10 degree intervals facing both the left and right sides in the circumferential direction (in specific terms, items that respectively differ by ±10 degrees, ±20 degrees, and ±30 degrees in both the left and right circumferential directions). By making available and providing to the market in advance a series of lenses differentiated in this way on the special radial line 30, it is possible to quickly provide a suitable contact lens for correction of irregular astigmatism 20 even for patients for which there is a relatively big difference in the circumferential direction of the steepening position of the cornea due to a conical cornea, for example.

Furthermore, it is also possible to provide as a series a combination of lenses not only having mutually different lens powers, but also having mutually different relative size ratios of the positive correction area 27 and the negative correction area 28 on the special radial line 30. In specific terms, it is also possible to provide as a series lenses combining a mode for which, for example as shown in FIGS. 14 and 15, the positive correction area 27 is set to be relatively large compared to the negative correction area 28, or as shown in FIGS. 16 and 17, a mode for which the positive correction area 27 is set to be relatively smaller than the negative correction area 28, in addition to lenses for which as with the embodiment described previously, the positive correction area 27 and the negative correction area 28 are set to be roughly the same size.

Figure 14:
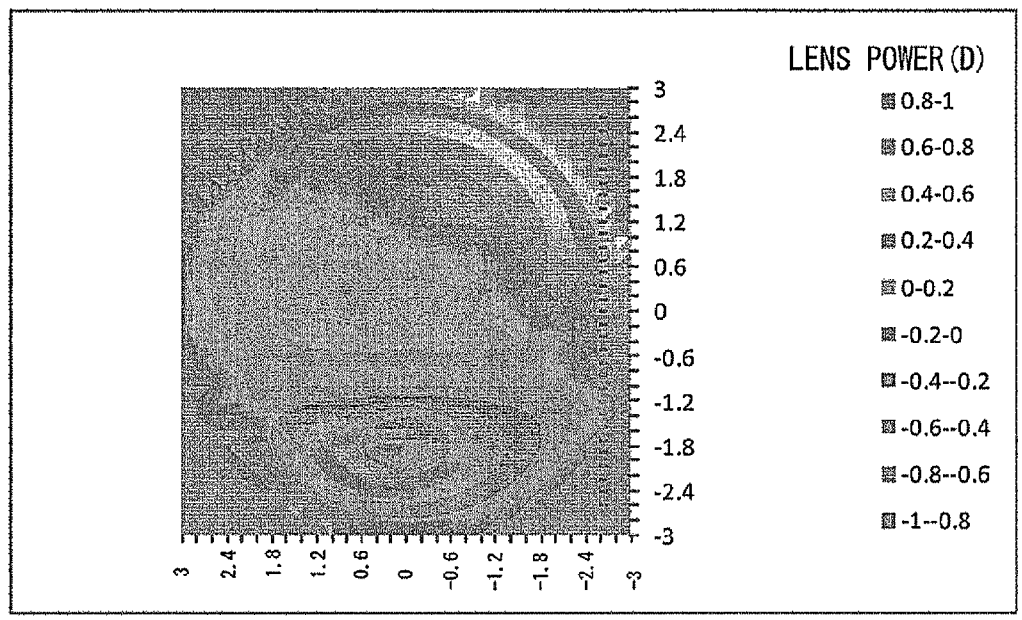
FIG. 14 is an explanatory drawing showing a lens power distribution with a contact lens for correction of irregular astigmatism which is another mode of the present invention.
Figure 15:
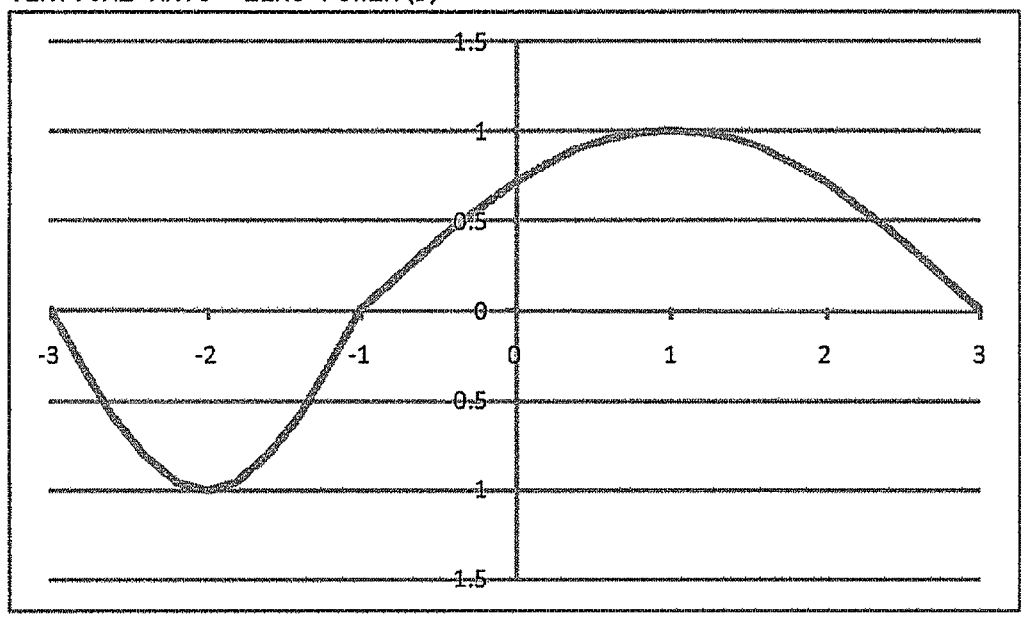
FIG. 15 is an explanatory drawing showing the lens power distribution shown in FIG. 14 in graph form on a special radial line.

The mode shown in FIGS. 14 and 15 is particularly suitably prescribed in cases when the corneal projection is seen at a position lower than the standard conical cornea, or cases when the stable position of the lens on the cornea is at a position higher than the standard, or the like. This is probably because in such cases, the ± symbol switching position of the power distribution on the special radial line is at a position relatively lower than the standard.

Figure 16:
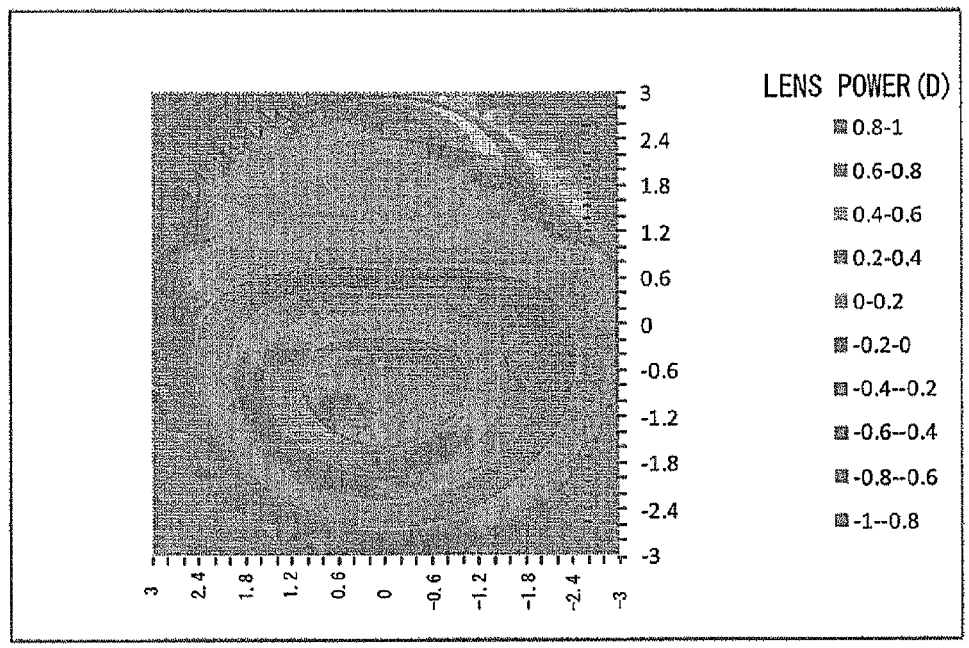
FIG. 16 is an explanatory drawing showing a lens power distribution with a contact lens for correction of irregular astigmatism of yet another mode of the present invention.
Figure 17:
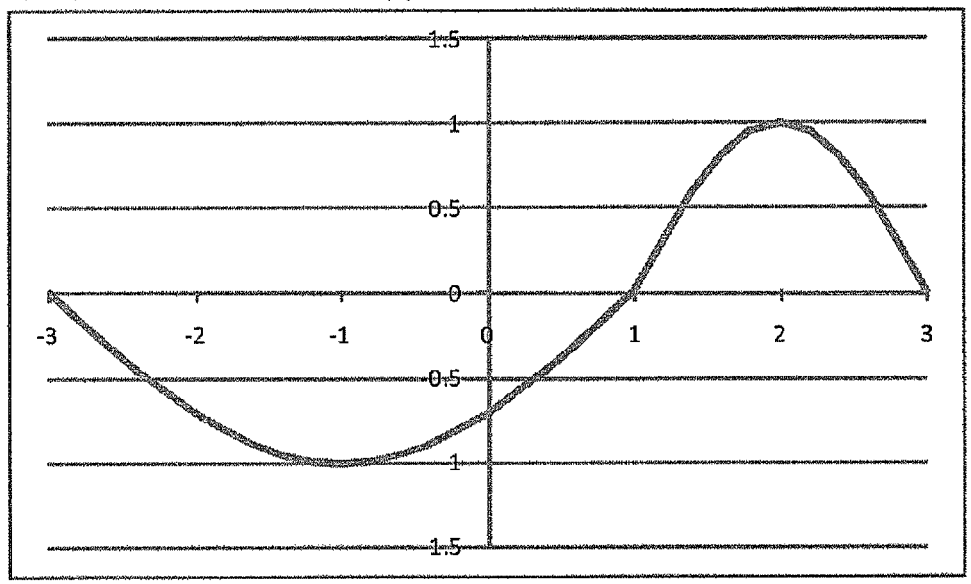
FIG. 17 is an explanatory drawing showing the lens power distribution shown in FIG. 16 in graph form on a special radial line.

Meanwhile, the mode shown in FIGS. 16 and 17 is particularly suitably prescribed in cases when the corneal projection is seen at a position higher than the standard conical cornea, or cases when the stable position of the lens on the cornea is at a position lower than the standard, or the like. This is probably because in such cases, the ± symbol switching position of the power distribution on the special radial line 30 is at a position relatively higher than the standard.

Figure 20:
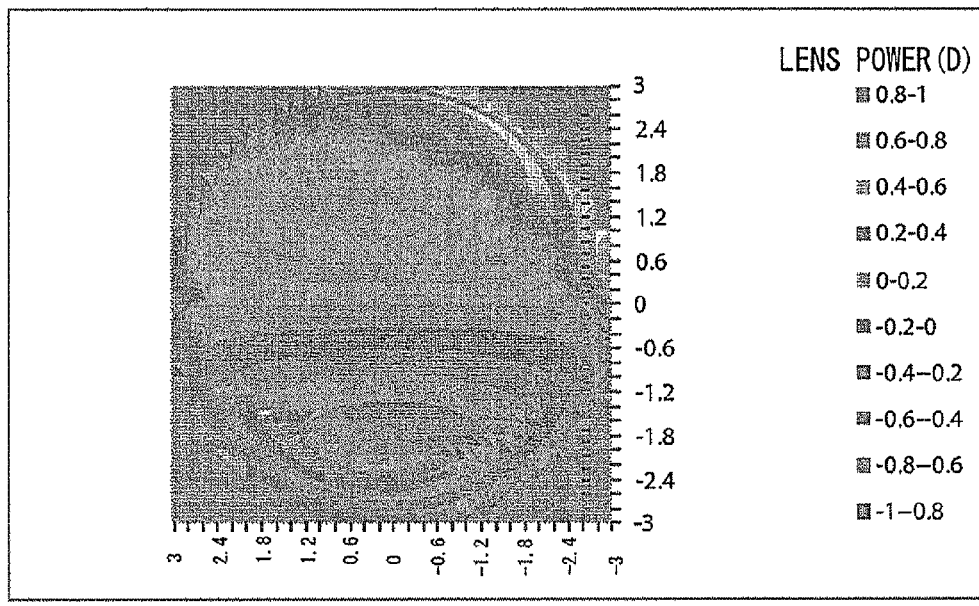
FIG. 20 is an explanatory drawing showing a lens power distribution of a contact lens for correction of irregular astigmatism which is yet another mode of the present invention.
Figure 21:
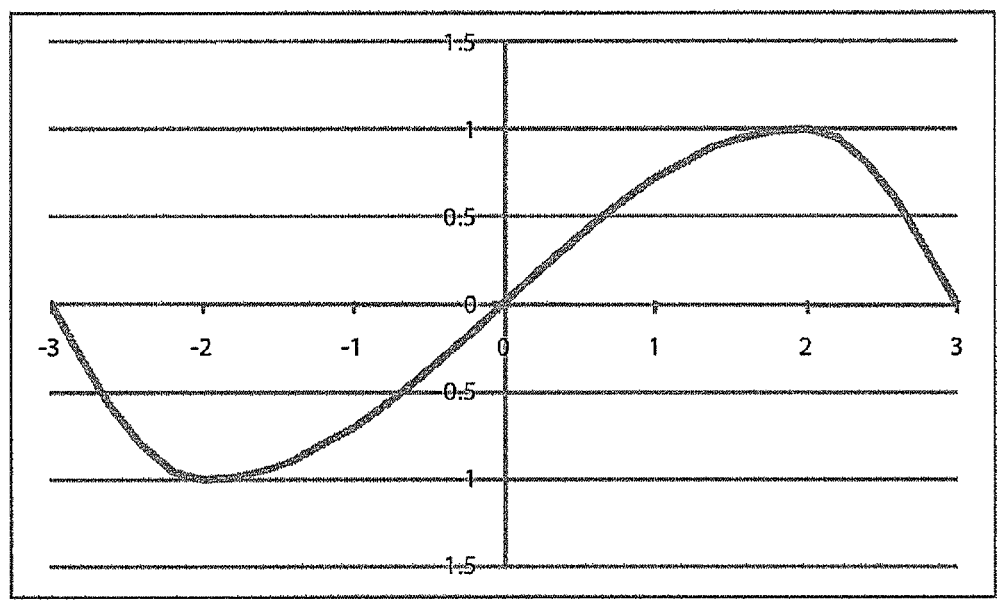
FIG. 21 is an explanatory drawing showing the lens power distribution shown in FIG. 20 in graph form on a special radial line.

Furthermore, it is also possible to provide as a series a combination of lenses for which not only the lens power, but also the position of each extreme value point of the positive correction area 27 and the negative correction area 28 are made to be mutually different on the special radial line 30. In specific terms, it is also possible to provide as a series lenses combining a mode for which, for example as shown in FIGS. 18 and 19, the extreme value point of the positive correction area 27 and the extreme value point of the negative correction area 28 are set to be positioned mutually closer than the center of each correction area on the special radial line 30, conversely as shown in FIGS. 20 and 21, a mode for which the extreme value point of the positive correction area 27 and the extreme value point of the negative correction area 28 are set to be positioned mutually more separated from the center of each correction area on the special radial line, in addition to lenses for which as with the embodiment described previously, the extreme value points are positioned at the center of the positive correction area 27 and the negative correction area 28.

Figure 18:
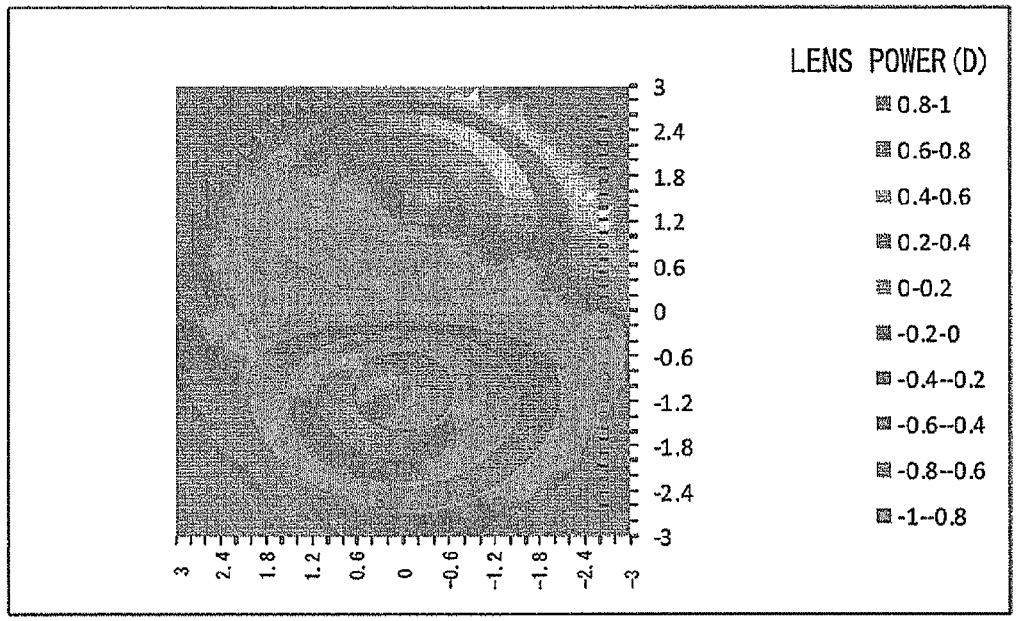
FIG. 18 is an explanatory drawing showing a lens power distribution with a contact lens for correction of irregular astigmatism which is yet another mode of the present invention.
Figure 19:
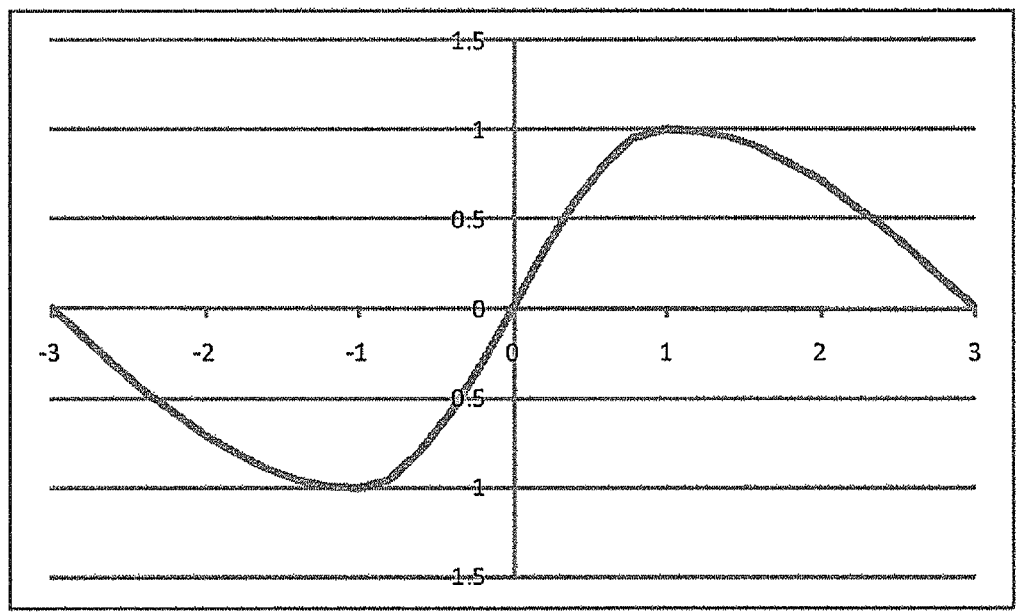
FIG. 19 is an explanatory drawing showing the lens power distribution shown in FIG. 18 in graph form on a special radial line.

The mode shown in FIGS. 18 and 19 is especially suitably prescribed in cases when the corneal projection is seen at a position slightly higher than the standard conical cornea, cases when the asymmetrical element increases due to steepening of the cornea in a narrower range and the like. Meanwhile, the mode shown in FIGS. 20 and 21 is suitably prescribed in cases such as for example when an area is found with flattening in the central portion of the cornea due to wearing of hard contact lenses for correcting the conical cornea or the like.

Above, we described several examples of specific modes of the present invention, but the present invention is not interpreted as being limited by these specific descriptions.

For example, on the contact lens for correction of irregular astigmatism 20, it is possible to form an optical surface that gives the positive correction area 27 and the negative correction area 28 as described previously on either one of the front surface or back surface of the optical part 22, but it is also possible to give a spherical lens or cylindrical lens using a suitable power or axial direction in relation to that optical surface or the surface opposite to that. By doing this, it is possible to correct myopia or the like due to a low order aberration in addition to irregular astigmatism simply by correcting the optical system of the eye using the optical characteristics of the contact lens for correction of irregular astigmatism 20 without using this in combination with eye glasses as in a previous example.

Also, with examination by the inventors of this invention, the comatic aberration due to a conical cornea was confirmed to occur as post-surgical irregular astigmatism due to the intraocular lens tilt arrangement or to eccentricity of the cornea refraction correction treatment position or the like after ophthalmic surgery such as for example for wearing of an intraocular lens or correction of corneal refraction or the like. Then, for these post-surgical irregular astigmatisms as well, the contact lens for correction of irregular astigmatism 20 constituted according to the present invention as described previously can be suitably prescribed. In fact, in contrast to irregular astigmatism due to a conical cornea, post-surgical irregular astigmatism was not confirmed to occur with a concentration in a statistically specific direction, so this is even more suitably handled by combining and providing as a series lenses for which equal intervals are set in the entire circumference direction for the relative position in the circumferential direction of the special radial line 30 in relation to the circumferential rest positioning mechanism.

KEYS TO SYMBOLS

20: Contact lens for correction of irregular astigmatism, 22: Optical part, 24: Peripheral part, 25: Edge part, 27: Positive correction area, 28: Negative correction area, 30: Special radial line

The invention claimed is:

1. A contact lens for correction of irregular astigmatism, which is adapted to correct asymmetrical power difference due to irregular astigmatism, comprising:
    a positioning mechanism provided for specifying a circumferential rest position of the contact lens in a worn state;
    a positive correction area using a positive lens power on one side on a special radial line at the circumferential rest position specified by the positioning mechanism; and
    a negative correction area using a negative lens power at another side on the special radial line,
    wherein with the positive correction area, the positive lens power is set so as to gradually become larger from an outer peripheral edge part toward a central portion, and with the negative correction area, the negative lens power is set so as to gradually become smaller from an outer peripheral edge part toward a central portion.

2. The contact lens for correction of irregular astigmatism according to claim 1, wherein the special radial line extends in a vertical direction at the circumferential rest position of the contact lens specified by the positioning mechanism.

3. The contact lens for correction of irregular astigmatism according to claim 2, wherein on the special radial line, the positive correction area is provided on a top side, and the negative correction area is provided on a bottom side.

4. The contact lens for correction of irregular astigmatism according to claim 1, wherein on the special radial line, the positive correction area and the negative correction area are formed having lens powers that change smoothly.

5. The contact lens for correction of irregular astigmatism according to claim 1, wherein the asymmetrical power difference is an asymmetrical power difference due to a conical cornea, and the lens is used for correction of irregular astigmatism due to the asymmetrical power difference.

6. The contact lens for correction of irregular astigmatism according to claim 1, wherein sandwiching an orthogonal radial line in relation to the special radial line, one half cycle side is used as the positive correction area, and another half cycle side is used as the negative correction area.

7. The contact lens for correction of irregular astigmatism according to claim 1, wherein by forming either of the positive correction area or the negative correction area expanding from one half cycle side to another half cycle side beyond an orthogonal radial line in relation to the special radial line, relative sizes of the positive correction area and the negative correction area differ.

8. The contact lens for correction of irregular astigmatism according to claim 1, wherein at least one of a maximum lens power of the positive correction area and a minimum lens power of the negative correction area is set on the special radial line, and at a position away from a center of the positive correction area and the negative correction area.

9. The contact lens for correction of irregular astigmatism according to claim 1, wherein a maximum lens power of the positive correction area and a minimum lens power of the negative correction area are both set at positions having a separation distance of 0.5 to 2.5 mm from a lens geometric center.

10. The contact lens for correction of irregular astigmatism according to claim 1, wherein an absolute value of a maximum lens power of the positive correction area and an absolute value of a minimum lens power of the negative correction area are the same as each other.

11. The contact lens for correction of irregular astigmatism according to claim 1, wherein the lens is constituted by combining with eye glasses equipped with lenses for correcting low order aberration refractive errors through a spherical lens power and a cylindrical lens power, and corrects an optical system of eyes in cooperation with those eye glasses.

12. The contact lens for correction of irregular astigmatism according to claim 1, wherein the lens is constituted by combining with a hard contact lens for correcting low order aberration refractive errors through a spherical lens power, and corrects an optical system of eyes in cooperation with the hard contact lens.

13. The contact lens for correction of irregular astigmatism according to claim 1, wherein the lens has optical characteristics for correcting low order aberration refractive errors through a spherical lens power and a cylindrical lens power.

14. A contact lens combination series for which a plurality of contact lenses having mutually different asymmetrical power distributions are combined together, each of the contact lenses comprising:
  a positioning mechanism provided for specifying a circumferential rest position of the contact lens in a worn state;
  a positive correction area using a positive lens power on one side on a special radial line at the circumferential rest position specified by the positioning mechanism; and,
  a negative correction area using a negative lens power at another side on the special radial line,
  wherein with the positive correction area, the positive lens power is set so as to gradually become larger from an outer peripheral edge part toward a central portion, and with the negative correction area, the negative lens power is set so as to gradually become smaller from an outer peripheral edge part toward a central portion, and
  the positive lens power of the positive correction area and the negative lens power of the negative correction area of the respective contact lenses are different at a plurality of stages so that the contact lenses are provided as the contact lenses for correction of irregular astigmatism that combines together items set with mutually different optical characteristics.

15. The contact lens combination series according to claim 14, wherein optical characteristics for the respective contact lenses are made to be different by making a difference between a maximum value of the positive lens power of the positive correction area and a minimum value of the negative lens power of the negative correction area different at a plurality of stages for every two diopters.

16. The contact lens combination series according to claim 14, wherein at each stage for which the positive lens power of the positive correction area and the negative lens power of the negative correction area are made different at a plurality of stages, mutually different optical characteristics are further set by making a position of a maximum lens power of the positive correction area and a position of a minimum lens power of the negative correction area different at a plurality of stages from a lens geometric center on the special radial line.

17. The contact lens combination series according to claim 14, wherein at each stage for which the positive lens power of the positive correction area and the negative lens power of the negative correction area are made different at a plurality of stages, mutually different optical characteristics are further set by making a position of the special radial line in a circumferential direction in relation to a vertical direction at the circumferential rest position of the contact lens specified by the positioning mechanism different at a plurality of stages.

* * * * *